United States Patent
Tärnskär et al.

(10) Patent No.: US 11,261,651 B2
(45) Date of Patent: *Mar. 1, 2022

(54) VACUUM INSULATING GLASS UNITS BASED ON TOPOGRAPHIC REPRESENTATIONS

(71) Applicant: VKR HOLDING A/S, Hørsholm (DK)

(72) Inventors: Ingemar Tärnskär, Hørsholm (DK); Utku Ahmet Özden, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 0 days.
This patent is subject to a terminal disclaimer.

(21) Appl. No.: 16/970,205

(22) PCT Filed: Feb. 20, 2019

(86) PCT No.: PCT/DK2019/050061
§ 371 (c)(1),
(2) Date: Aug. 14, 2020

(87) PCT Pub. No.: WO2019/161864
PCT Pub. Date: Aug. 29, 2019

(65) Prior Publication Data
US 2021/0079714 A1    Mar. 18, 2021

(30) Foreign Application Priority Data

Feb. 22, 2018 (DK) .............................. PA201870116
Feb. 22, 2018 (DK) .............................. PA201870117

(51) Int. Cl.
*E06B 3/67* (2006.01)
*E06B 3/66* (2006.01)
(Continued)

(52) U.S. Cl.
CPC ........ *E06B 3/6612* (2013.01); *E06B 3/66304* (2013.01); *E06B 3/6775* (2013.01);
(Continued)

(58) Field of Classification Search
CPC .... E06B 3/67326; E06B 3/6775; E06B 3/673; E06B 3/67365; E06B 3/67369
See application file for complete search history.

(56) References Cited

U.S. PATENT DOCUMENTS

| 4,132,218 A | 1/1979 | Bennett |
| 5,815,273 A * | 9/1998 | Lisec .................. E06B 3/67365 |
| | | 356/600 |
| 2009/0324858 A1 | 12/2009 | Jaeger |

FOREIGN PATENT DOCUMENTS

| EP | 0129102 A2 | 12/1984 |
| EP | 1018493 A1 | 7/2000 |

(Continued)

OTHER PUBLICATIONS

International Search Report for corresponding PCT/DK2019/050061 filed Feb. 20, 2019; dated May 16, 2019.
(Continued)

*Primary Examiner* — Donald J Loney
(74) *Attorney, Agent, or Firm* — Cantor Colburn LLP

(57) ABSTRACT

The invention relates to a method of providing vacuum insulating glass (VIG) units each comprising at least a first and a second glass pane and a plurality of support pillars distributed between opposing surfaces of said glass panes to provide a gap (8) between the glass panes. A plurality of pane elements are provided, and individual topographic representations (TOPREP_2*a*-TOPREP_2*n*) of each of said plurality of pane elements (2*a*-2*n*) are obtained based on input (4) from a measuring arrangement (3), and the topographic representations are stored in a data storage (DS). The stored topographic representations are processed and resulting surface distance characteristic between pairs of panes are estimated. Vacuum insulating glass (VIG) assemblies are thus provided based on estimated resulting surface distance characteristics. The invention additionally relates to (Continued)

Figure 1:
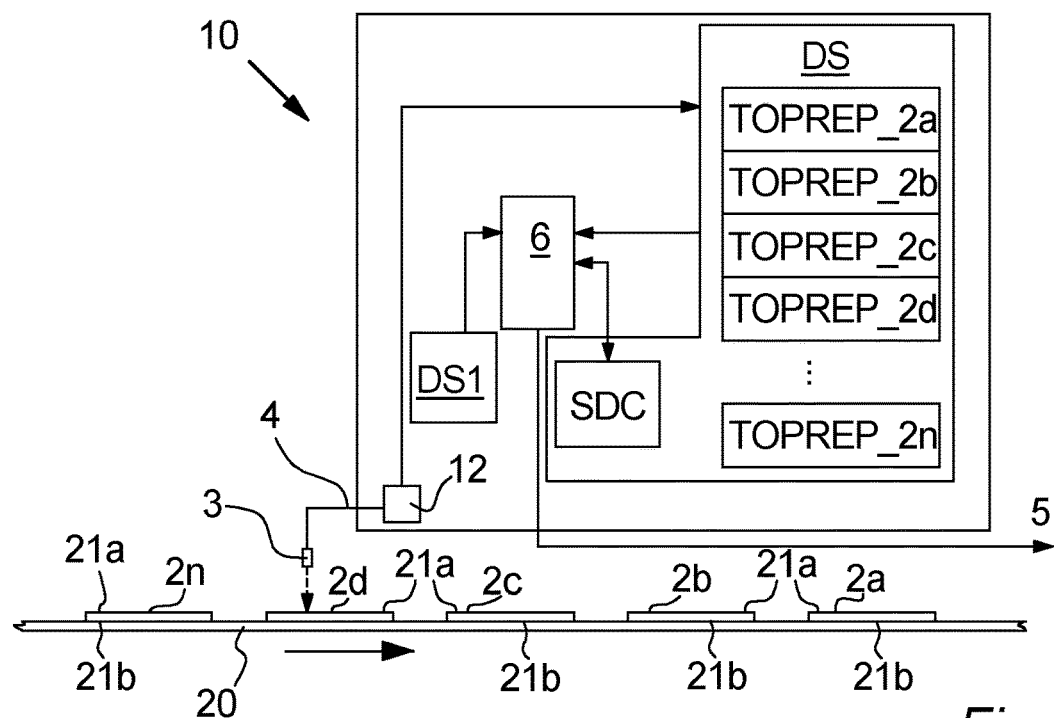

a system for providing manufacturing layouts and a manufacturing facility.

18 Claims, 10 Drawing Sheets

(51) Int. Cl.
*E06B 3/663* (2006.01)
*E06B 3/673* (2006.01)
*E06B 3/677* (2006.01)

(52) U.S. Cl.
CPC ....... *E06B 3/67326* (2013.01); *E06B 3/67365* (2013.01); *E06B 3/67369* (2013.01); *E06B 2003/66338* (2013.01)

(56) References Cited

FOREIGN PATENT DOCUMENTS

| | | |
|---|---|---|
| EP | 3210944 A1 | 8/2017 |
| WO | 2013085480 A1 | 6/2013 |

OTHER PUBLICATIONS

International Search Report for corresponding PCT/DK2019/050062 filed Feb. 20, 2019; dated May 16, 2019.

\* cited by examiner

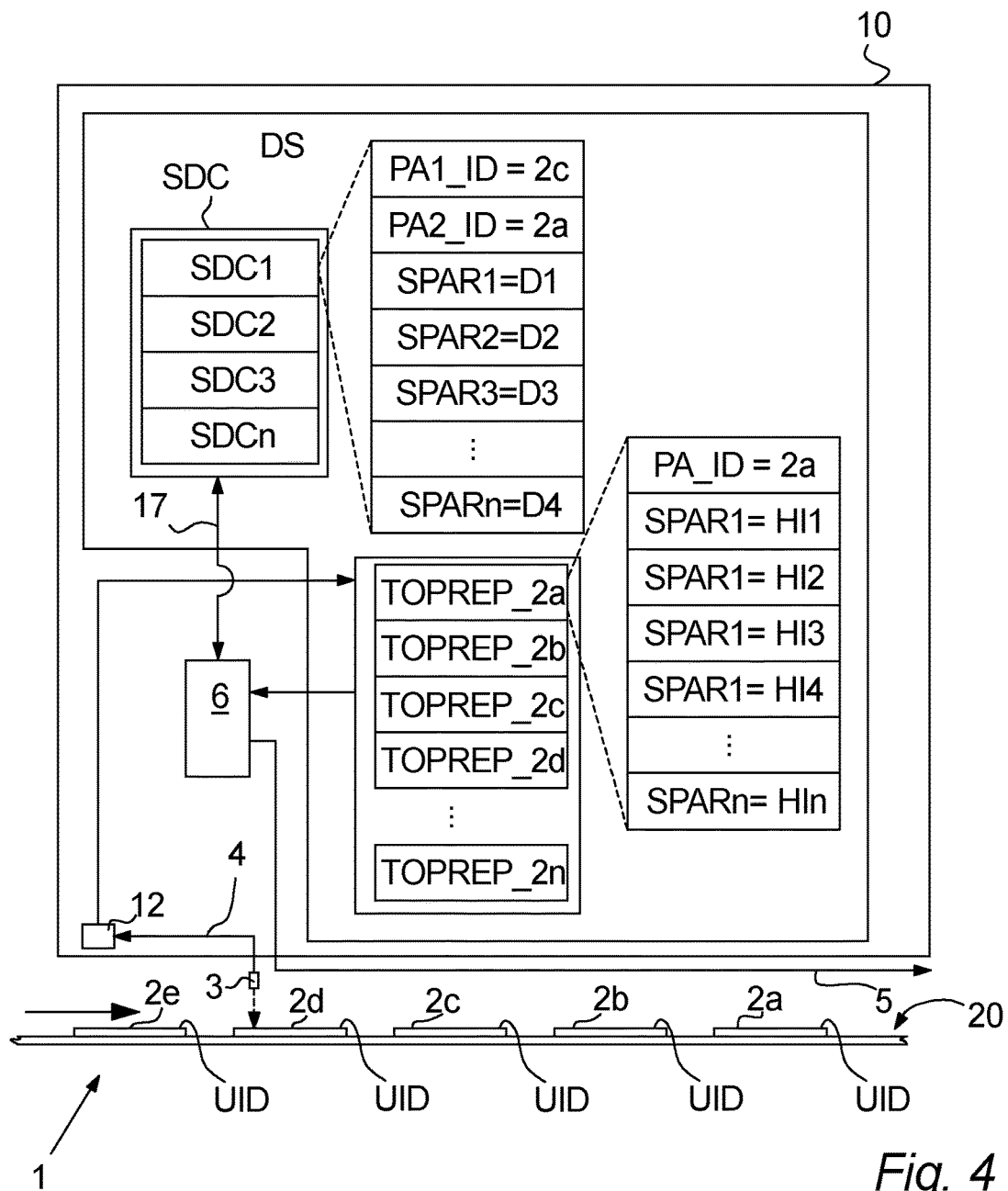
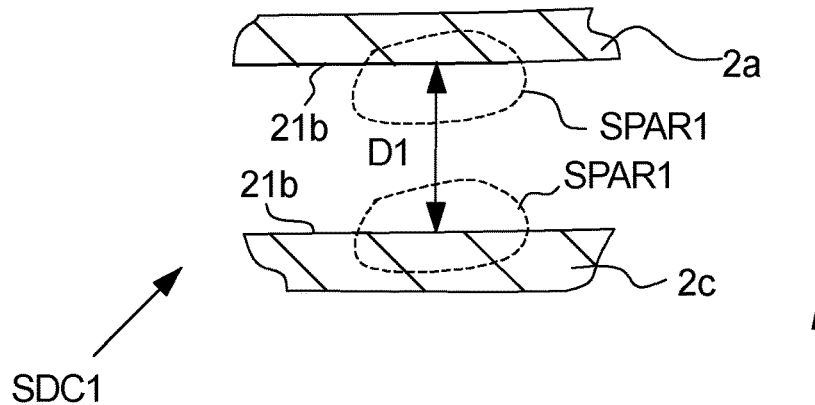
Fig. 4
Fig. 4a

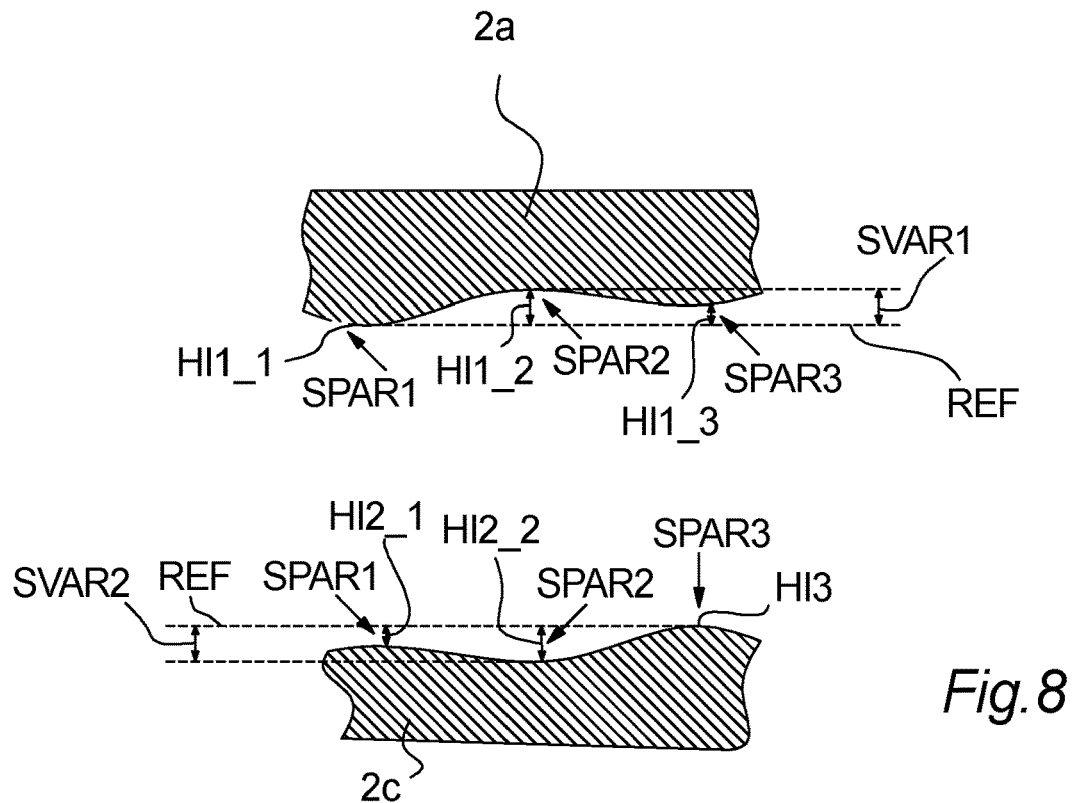
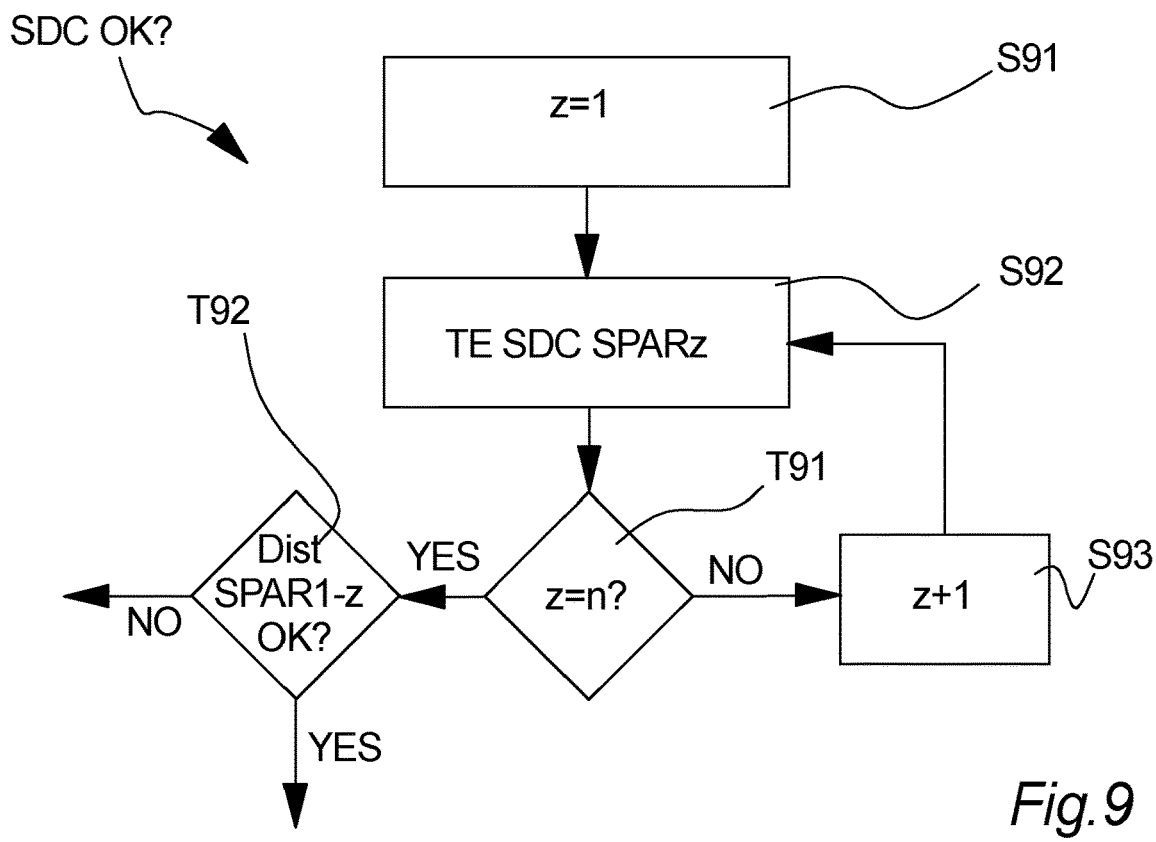
Fig. 8
Fig. 9

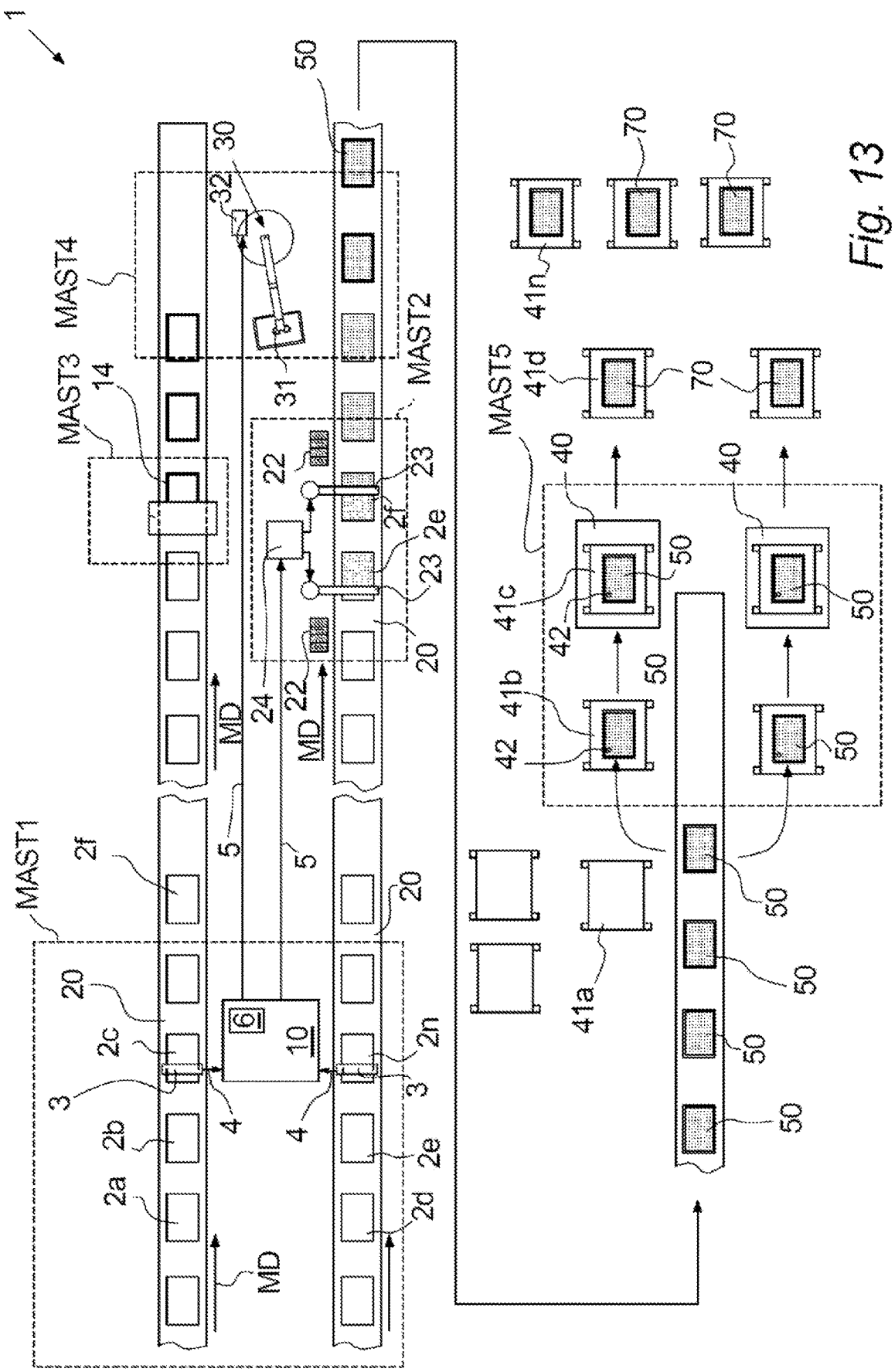

VACUUM INSULATING GLASS UNITS BASED ON TOPOGRAPHIC REPRESENTATIONS

The invention relates to a method of providing vacuum insulating glass (VIG) units, and a system for providing manufacturing layouts for VIG units based on stored, topographic representations, and a manufacturing facility for manufacturing VIG units.

BACKGROUND

Vacuum insulating glass (VIG) units requires high quality demands in order to obtain a sufficiently air-tight and long lasting VIG units. This is especially the case in applications where the VIG unit is used for covering apertures of buildings such as window and/or door openings, as the VIG in such applications may be exerted to different conditions such as large temperature variations dependent of the geographical location of the building, and/or external forces provided by e.g. objects such as balls hitting the pane and/or weather conditions such as storms, hurricanes, hailstones etc. Such conditions may, over several years, wear on the VIG unit and thus result in undesired drawbacks. Such undesired drawbacks may be that the VIG unit malfunctions before the expected/desired lifetime of the VIG unit due to e.g. cracks in one of the panes thereby reducing or destroying the desired vacuum condition in the VIG assembly, due to scratches provided by support pillars and/or the like due to shear forces, due to support pillars falling towards the bottom of a gap between the panes or displacing between panes, etc.

EP 3 210 944 A1 discloses a vacuum plate where support structures with different heights are provided between adjacent layers. Then a sealing mixture is provided at the upper surface rim of the first plate, and the plate is then covered again to form a vacuum plate assembly. However, the solution disclosed in this document suffers from several drawbacks, e.g. as it may require a rather slow and complex solution from a large scale manufacturing perspective, and also other drawbacks such as increased pollution risks of the plate surfaces. Moreover, it might provide drawbacks in relation to providing the correct pillar height.

It may e.g. be an object of the present invention to provide a solution where one or more of the above mentioned undesired drawbacks are reduced or even avoided.

It may e.g. also or alternatively be an object of the invention to provide an improved manufacturing of VIG assemblies which may result in an improved yield of VIG assemblies having the estimated/expected lifetime of e.g. 15-20 years or more.

SUMMARY

The invention relates to a method of providing vacuum insulating glass units, wherein the method may comprise one or more of the steps of:
  providing a plurality of pane elements,
  obtaining individual topographic representations of each of said plurality of pane elements based on input from a measuring arrangement, and storing said topographic representations in a data storage,
  processing a plurality of the stored topographic representations by means of a data processing arrangement to estimate a resulting surface distance characteristic between pairs of panes represented by the respective processed topographic representations, and based on the estimated resulting surface distance characteristic, vacuum insulating glass assemblies are provided, each comprising at least a first and a second glass pane and a plurality of support pillars distributed between opposing surfaces of said glass panes to provide a gap between the glass panes.

The vacuum insulating glass (VIG) assemblies are then used for providing said vacuum insulating glass (VIG) units.

When providing vacuum insulating glass (VIG) units for apertures of buildings such as windows, door and the like, it is important that such VIGs can withstand the external forces such as wind forces, rain, hailstorms, objects hitting the pane, temperature differences between inside and outside the building and the like. Some of these forces may strike the VIG at a local area of the pane and/or at the entire pane surface.

In VIG units, support pillars are distributed, preferably evenly, e.g. in rows, in the gap between the panes. This is done in order to provide that when the pressure is reduced in the gap by a vacuum pump, and the gap is subsequently sealed, this will force the opposing panes towards each other, and in order to obtain that the panes are kept separated by the gap, to obtain a good insulation/U-value of the VIG unit, the support pillars are provided.

However, glass panes used for VIG units does not have completely flat surfaces, but the relative surface heights may vary across the length and/or width of the pane due to e.g. "roller waves" caused by supporting rollers which supports the pane during manufacturing of the pane, due to "edge lift" causing the pane to deflect between two opposite edges of the pane, thereby causing a parabola or hyperbola shape and/or the like. This may e.g. especially apply for tempered glass such as thermally tempered glass. Such surface unevenness may only cause minor or no problems during manufacturing of conventional, insulating glass pane units which are not provided with a vacuum condition in the gap between the panes.

As the pane surfaces are not completely straight, and as a vacuum pressure is applied in the gap between the panes of the VIG unit, this may accordingly cause unwanted stresses to the panes e.g. proximate the locations of the support pillars, as the panes are sucked towards the support pillars when the vacuum is applied. For example, if, at locations where the support pillars have a height that is too small compared to the distance between the surfaces of the panes facing the gap at the locations, it may result in that the force is distributed across a smaller amount of pillars and thus e.g. increase the pressure on e.g. the surrounding pillars. Insufficiently sized support pillars may e.g. also increase the risk of that these pillars may fall to the bottom of the pane in the gap between the panes if the VIG is subjected to external forces such as objects hitting the pane, a wind gust, a smaller reduction of the vacuum in the pane and/or the like, and this may at least provide unwanted aesthetic drawbacks.

Additionally, if a support pillar is too high compared to the local distance condition at positions/areas where the support pillar is to be placed, it may cause that the support pillar provides a rather large force to support the panes and thus provide the gap compared to the surrounding support pillars, thereby risking an increased, unwanted stress condition of the panes at that area.

The present invention provides that the manufacturing of the VIG unit is based on estimated resulting surface distance characteristic which has been determined based on an initial measurement to determine individual topographic representations.

Hence, the VIG unit may be manufactured based on the individual surface characteristics of the respective pane combinations and this may in the end e.g. result in an improved yield of VIG assemblies having an estimated/expected lifetime of VIG units for apertures of buildings such as of e.g. 15-20 years or more.

Moreover or alternatively, it may provide advantages in relation to provide an advantageous manufacturing line for VIG units, as the individual topographic representations are determined by a measurement arrangement, as this may e.g. provide a less space consuming manufacturing line, it may provide more freedom in combinations of panes and/or support pillar to provide an improved VIG unit, and/or other advantages compared to known solutions where the distance between surfaces of opposing panes in the gap between the panes is determined to decide pillar height.

Moreover, it may provide more freedom in relation to where the topographic representations and/or the estimated surface distance characteristics are determined.

Additionally, the estimated resulting surface distance characteristic and/or details regarding the individual VIG unit components may accordingly be used at a later stage for traceability in order to, over time, be able to improve the manufacturing of VIG units.

The vacuum insulating glass (VIG) assemblies are as mentioned used for providing the vacuum insulating glass (VIG) units. The vacuum insulating glass (VIG) units comprises the VIG assembly and an edge seal solution, such as solder, for example a glass frit edge seal material extending along the edges of the first and second panes, thereby enclosing the gap. The support pillars are distributed in the gap and the gap of the VIG unit is evacuated and sealed. One of the panes may in aspects comprise an opening through which the gap between the panes has been evacuated before closing the opening and hence sealing the gap, e.g. also by means of a solder (such as glass frit material) sealing solution, for example also including an evacuation tube that may be sealed after evacuation of the gap.

The edge seal may e.g. also be provided by a metal solder material or a clamping solution in aspects of the present invention.

The vacuum insulating glass (VIG) assemblies may be understood as an assembly comprising said at least first and a second glass panes and the plurality of support pillars distributed between opposing surfaces of said glass panes to maintain a gap between the glass panes. It is generally understood that the vacuum insulating glass (VIG) assemblies may also include the edge seal in aspects of the present disclosure. The vacuum insulating glass (VIG) assemblies may hence be ready for heating the edge seal (if necessary) and/or evacuation of the gap, and the subsequent sealing of the gap between the first and second panes after the evacuation.

In preferred aspects of the invention, said processing of a plurality of the stored topographic representations by means of the data processing arrangement comprises estimating a plurality of resulting surface distance characteristics for a plurality of pairs of pane elements, and storing said plurality of resulting surface distance characteristics in a data storage.

In preferred aspect of the invention, said data processing arrangement may determine one or more manufacturing layouts based on said estimated, resulting surface distance characteristic, wherein a data output is provided based on said one or more manufacturing layouts, and wherein content of said data output is preferably utilized during subsequent manufacturing of said vacuum insulating glass units.

The manufacturing layout provides large freedom in producing the VIG, as it may be utilized at one or more different manufacturing sections where e.g. support pillars are selected and/or placed at one of the panes, where the panes are combined/paired and/or the like.

The manufacturing layout may e.g. comprise information regarding a pillar height to be utilized when combining two or more panes to provide a VIG, e.g. in relation to different pillar heights at different support positions/areas in the gap between the VIG, it may comprise information regarding how panes should be orientated relative to each other, it may comprise information regarding which specific panes to be combined (e.g. based on a unique identifier of the pane) and/or the like.

Moreover the manufacturing layout may be utilized for logistic purposes.

In preferred aspects of the invention, a support pillar distribution station may comprise a support pillar placement arrangement, a pillar distribution controller may process data of said manufacturing layouts and support pillars may be distributed in accordance therewith by means of said support pillar placement arrangement.

Such a support pillar placement arrangement may comprise a "pick and place" automation solution such as a robotic solution, e.g. a robotic arm or a delta robot solution, a distributed set of support pillar outlets and/or the like, which may be operated by a data processor in accordance with the data of the manufacturing layouts.

Thereby, the pillars may be placed automatically in accordance with the individual topographic representations, and thus, an individualized manufacturing of VIG units may be provided.

In preferred aspects of the invention, a support pillar type to be utilized at different predefined support areas in the gap between said first and second panes is determined by a data processing arrangement based on pillar representation data and said estimated surface distance characteristic(s). The support pillar type may in further aspects of the invention be identified by means of said manufacturing layouts.

This may e.g. provide a fast and efficient solution for providing VIG units compensated for surface variations.

In preferred aspects of the invention, the support pillar type to be utilized at different predefined support areas may be identified in a manufacturing layout stored in a data storage and/or is transmitted/provided as an output, and this information may thus be used at a manufacturing arrangement where e.g. support pillars are placed during manufacturing of a VIG unit.

A support pillar type may e.g. be selected based on different parameters such as pillar height, pillar material, pillar hardness, pillar density, and pillar shape. It is understood that the support pillar type in preferred embodiments of the invention may be based on the height of the respective support pillar.

This may e.g. provide the advantages of individualized manufacturing of VIG units with respect to pillar height at desired support areas of the panes.

In aspects, the plurality of support pillars may be selected by the processing arrangement based on the estimated surface distance characteristic(s) related to one or more of the glass panes of the VIG unit assembly that is used for manufacturing the VIG unit, and may comprise different pillar types having different properties. These different properties may e.g. comprise one or more differences in different pillar heights, pillar material, pillar hardness, pillar density, and/or pillar shape.

In advantageous aspects of the invention, said plurality of support pillars determined by a processing arrangement to be arranged in the gap at different support areas may have different heights.

This may in preferred embodiments of the invention be determined/selected by a processing arrangement based on pillar representation data and said estimated surface distance characteristic(s), and the height of the pillar may e.g. be a distinguishing feature of a support pillar type, i.e. so that a first pillar type has a first height, and another pillar type has another height.

Generally, by selecting the support pillars in accordance with an estimated resulting surface distance characteristic and/or topography representations, for panes decided to be paired to obtain a VIG unit, this may help to reduce stress at the VIG panes, it may reduce the number of scratches over time provided by support pillars due to shear forces, It may help to reduce the risk of support pillars falling towards the bottom of the gap between the panes of the VIG unit or displacing between panes, and/or the like.

Additionally or alternatively, it may increase the chance of that a support pillar does not displace from the initial, support position/area if the panes are subjected to external forces causing the panes to slightly deflect relative to each other.

In preferred embodiments of the invention, a data processing arrangement determine a support pillar template, e.g. as part of a manufacturing layout, where said support pillar template at least comprises information regarding height and/or type of support pillars to be utilized at different positions in the gap between panes to be paired.

Thus, the height of the support pillars to be used at different positions between the panes selected/determined to be paired varies in accordance with the support pillar template suggestion and accordingly the estimated surface distance characteristic. This provides that the height of the support pillars varies in accordance with the surface topography of the panes to be paired, which may help to reduce e.g. localized stress forces after the pressure has been reduced in the gap between the panes.

In advantageous aspects of the present invention, the height of the support pillars to be used at different support areas in the gap between said first and second panes is selected among a plurality of predefined support pillar heights, preferably a predefined number of support pillar heights, by a data processing arrangement, and wherein support pillar information enabling an identification of support pillars having the selected pillar height at the respective support areas is preferably provided in manufacturing layouts.

This may e.g. provide advantages from a "large scale" manufacturing point of view, as the use of a predefined support pillar heights may help to reduce the manufacturing costs of a VIG unit. For example, the manufacturing line may have access to a predefined number of predefined support pillar heights between 2 and 50, such as between 2 and 20, e.g. between 4 and 10 different support pillar heights, in a support pillar storage. The height of these may be accessible by the mentioned data processing arrangement, and the selection of pillars may thus be based on available pillar heights.

In aspects of the invention, a solder material such as a glass frit material, which in the end, after a heating process, may constitute the support pillars at support areas, may be used for support pillars.

In preferred aspects of the present invention, said first and second glass panes of the vacuum insulating glass assembly are selected between said plurality of pane elements by means of a data processing arrangement based on the estimated surface distance characteristics from a group of more than two pane elements.

Accordingly, a plurality of said estimated, resulting surface distance characteristics may be based on individual topographic representations obtained from the same pane, i.e. a topographic representation of a first pane may be compared to a second and third pane respectively to see which topographic representation of these panes that provides the best fit to the topographic representations of the first pane, based on predefined criteria.

This may provide that the processing arrangement may try out different pane combinations based on the topography representations in order to provide a VIG assembly where the estimated, resulting surface distance characteristic is optimized to reduce distance variations between the panes, to fit the pillar height for predetermined support pillar heights, to ensure that the distance does not exceed an upper threshold and/or a lower threshold and/or the like.

In advantageous aspects of the invention, pane orientation information representing information of a mutual, preferred orientation of the first and/or second glass panes, relative to the other of the first and/or second glass pane, may be determined based on said estimated surface distance characteristics by a processing arrangement, and preferably stored as a part of e.g. a manufacturing layout in a data storage and/or transmitted/retrieved.

This may e.g. provide that the processing arrangement may process the topography representations and/or estimated surface distance characteristics, and based on this, it may determine that two panes will fit better with respect to the mutual surface variations, if the orientation of one of the panes is changed with respect to the other pane, as this may e.g. help to get the surface variations at support areas to fit predefined pillar heights and/or the like.

In preferred aspects of the invention, said orientation information may comprise information of which pane surface to face another pane surface of the other pane of the vacuum insulating glass assembly, and/or which pane edges to be arranged at the same side of the vacuum insulating glass assembly.

The measurement arrangement may in advantageous aspects of the invention provide input of the surface variation of said panes at a plurality of predetermined support areas.

This may e.g. help to reduce needed data processing to subsequently determine support areas, as the retrieved data from the measuring arrangement thus already represents data from a predetermined support area.

In aspects of the invention, the measurement arrangement may provide input of the surface variation at no more than 97% such as no more than 80% e.g. no more than 60% of a plurality of predetermined support areas. The surface variation at the remaining support areas may thus be estimated by e.g. interpolation or any other suitable estimation method. In further embodiments of the invention, the measurement arrangement may provide input of the surface variation at substantially all of the predetermined support areas.

A pane may in aspects of the invention be moved in the movement direction MD substantially continuous across/through a measuring area of the measuring arrangement, or it may be moved in steps across a measuring area with intermediate movement breaks (where the surface at a predetermined support area is arranged so as to be measured by the measuring arrangement)

In preferred embodiments of the invention, the measurement arrangement may comprise an optical measurement arrangement, such as focal detection system, arranged to determine the surface topography comprising an estimate of the height of the surface at predefined locations of at least a part of the glass pane.

Advantageously, in aspects of the invention, an estimate of the height at predefined locations may be the height calculated relative to a pre-selected reference position on said glass pane surface, such as a specific first pillar support area.

The estimate of the surface distance characteristics between glass panes may advantageously, in aspects of the invention, be based on a comparison of estimated relative heights relative to a common reference points, such as a first pillar support area.

The measurement arrangement may e.g. in advantageous aspects of the invention, comprise a plurality of sensors arranged to determine/measure a part of the respective pane's surface topography, preferably at least at different, predefined locations of the surface of said plurality of panes.

This may e.g. help to provide a faster determination of a topography representation and thus increase manufacturing speed.

In preferred aspects, the measuring arrangement may comprise one or more sensors kept in a substantially fixed position while providing the measurements.

In general, it is to be understood that said plurality of panes which may potentially be paired preferably may have substantially similar shape and size.

Said sensors may in preferred aspects of the invention be distributed across a measuring area, preferably in one or more substantially linear rows, wherein the mutual distance between adjacent sensors in said one or more rows preferably is between 20 mm and 600 mm, such as between 40 mm and 450 mm, e.g. between 30 mm and 150 mm.

The measuring arrangement may advantageously, in aspects of the invention, comprise a plurality of sensors configured to measure on both sides of the pane simultaneously.

The measuring by the measurement arrangement to provide the input may e.g., in aspects of the invention, be provided with vertically positioned panes.

This may e.g. help to reduce to reduce gravity effects acting on the panes and thus influencing on the surface variations of the panes compared to if the panes are kept substantially horizontally during the measuring. It is however to be understood that in other embodiments of the invention, the panes may be kept substantially horizontal during the measuring, or in another angle between 0 and 90° compared to horizontal.

The measurement arrangement may in preferred aspects of the invention be an electromagnetic measuring arrangement, such as an optical measuring arrangement comprising one or more optical sensors and one or more light sources, and/or one or more image sensors.

It may be preferred that the measuring arrangement is configured to determine the surface variations without physical contact to the pane surface.

In preferred aspects of the invention, the one or more light sources may transmit light towards the respective pane surface, and the optical sensor(s) may detect the reflected light from said pane surface. The detected, reflected light is converted into an electronic signal which may be digitalized by an analog to digital converter (ADC).

In aspects of the invention, the measurement arrangement may comprise an image sensor such as a Charge-Coupled Device (CCD) sensor.

In other aspects of the invention, the measurement arrangement may comprise a mechanical measuring arrangement comprising at least one mechanical sensor arranged to have one or more components touching said surfaces and provide input based on the topography variations so as to obtain said individual topographic representations.

In advantageous aspects of the present invention, said processing of a plurality of the stored topographic representations by the data processing arrangement may comprise processing data relating to similar, opposite predefined support areas of two of said plurality of panes.

It is understood that "similar, opposite predefined support areas" may relate to support areas which, if the panes represented by the respective, topographic representations were physically paired and separated by support pillars, these similar predefined support areas would be arranged opposite to each other and a support pillar would extend between these areas. This may e.g. help to provide a more precise surface distance characteristic and/or reduce the needed processing to obtain a surface distance characteristic.

Each of said plurality of stored topographic representations may in aspects of the invention be assigned an identification, and wherein said identification is retrieved from or based on a unique identifier of the pane on which the respective topographic representation is based.

Said unique identifier on the panes may be a QR code, barcode, a tag such as a RFID TAG or the like, and this information is preferably retrieved from the pane by a scanning arrangement configured to scan/determine the unique identifier, e.g. when determining the topography of the pane surface, and is stored in a data storage together with the determined topography representation.

This may provide an advantageous traceability and handling of the panes and also the topographic representations. By assigning the topographic representations a Unique Identification according to or based on the unique identification on the respective pane, this may moreover provide logistical advantages later on when providing a VIG unit. For example, a subsequent manufacturing section/device for providing e.g. pillars, handling the panes or the like may be adapted to scan the ID of the pane(s) and thus provide the desired/determined actions based on the correct/intended estimated resulting surface distance characteristics.

The location/position of said unique identifier UID at the respective pane may e.g., in aspects of the invention be determined and utilized as a reference for subsequent processing to determine pane orientation and/or support area positions.

In aspects of the invention, said measurement arrangement may be configured to measure surface variations in the range of 0.05 mm to 0.3 mm, preferably in the range of 0.09 mm to 0.2 mm., and/or in some embodiments the measured surface variation may lie within the range of 0.1 to 0.15 mm Preferably, said measurement arrangement is configured to determine surface variations with a resolution between 0.005 mm and 0.08 mm, such as between 0.01 mm and 0.03 mm.

Said data storage, said manufacturing layouts and/or said topographic representations may in aspects of the invention comprise information of one or more of the following:
shape and/or size of pane related to the respective, individual topographic representation
a pane identification information and/or data relating to the time and/or date of the respective, individual topographic representation.

Said plurality of pane elements may preferably, in aspects of the invention, be made from thermally tempered glass.

Thermally tempered glass panes may comprise different surface variations caused by e.g. the manufacturing of the thermally tempered panes. Accordingly, especially if utilizing thermally tempered glass panes for the VIG units, it may be advantageous to provide different adaptions such as utilizing different pillar height, adapt pane orientations, provide pane selections based on estimated surface distance characteristics and/or the like to obtain VIG units with advantageous properties as e.g. described in this document.

Said topographic representations and/or said surface distance characteristics may advantageously, in aspects of the invention, comprise information of height and/or distance as a functions of a lateral displacement H(x), and/or information of height and/or distance as a function of the displacement across a surface plane H(x,y).

In aspects of the invention, said topographic representations may comprise image representations or profile representations of the surface topography.

In aspects of the invention, a levelling step is provided by the processing arrangement in order to level said topographic representations.

In one or more aspects of the invention, providing of said vacuum insulating glass (VIG) assemblies additionally comprises one or more of the steps of:
providing an edge sealing material to a glass pane of said vacuum insulating glass (VIG) assembly, such as to a surface of said first and/or second glass panes, and/or
arranging and aligning said first and second panes (2a-2n) of said vacuum opposite to each other with the support pillars (9) placed between the first and second glass sheets.

In one or more aspects of the invention, providing of said vacuum insulating glass (VIG) units by using said vacuum insulating glass (VIG) assemblies comprises heating said vacuum insulating glass (VIG) assemblies and/or evacuating the gap (8) between the first and second glass panes of the respective vacuum insulating glass (VIG) assembly. This may also in further aspects comprise that the evacuated gap between said glass panes is sealed, e.g. by sealing an evacuation opening.

The step of providing an edge seal may in aspects be provided at an edge sealing distribution station configured to provide an edge sealing to a pane of a VIG assembly. The step of arranging and aligning said first and second panes of said vacuum insulating glass (VIG) assemblies may in aspects be provided at a pane pairing station for arranging and aligning panes of a VIG assembly to be paired. The step of heating said vacuum insulating glass assemblies and evacuating a gap between paired glass panes (where the support structures have been placed in this gap) may be provided at a VIG heating and gap evacuation station. These stations may in aspects be located at the same VIG unit manufacturing facility.

The invention moreover, in a second aspect, relates to a system for providing manufacturing layouts for vacuum insulating glass units based on stored, topographic representations of surfaces of pane element, wherein said system comprises
a measuring arrangement comprising one or more surface variation determination sensors configured to measure surface variations of pane elements,
a data processing arrangement arranged to receive input from said one or more surface variation determination sensors, and process said input to establish individual topographic representations of the respective pane element, and
a data storage for storing a plurality of said topographic representations,
wherein said data processing arrangement is configured to process a plurality of the stored topographic representations and based thereon estimate a resulting surface distance characteristic between pairs of panes represented by the respective processed topographic representations, and
wherein a processing arrangement is configured to determine one or more manufacturing layouts based on said estimated, resulting surface distance characteristic, and store and/or provide an output based on said manufacturing layouts.

In preferred aspects of the second aspect, said manufacturing layouts may comprise information of support pillars, such as pillar height, for different, predefined positions (SPAR1-SPARn) between pairs of panes.

In preferred aspects of the invention, said information of support pillars may represent a grid of support pillars to be distributed between surfaces of panes to be assembled to provide a vacuum insulating glass assembly. This information of support pillars, such as pillar height may be provided by height estimation information, or it may be provided by a code or other identification means enabling a subsequent identification of the respective support pillar to be placed at a support position between pairs of panes.

In advantageous aspects of the second aspect, said manufacturing layouts comprises pane orientation information for respective panes to be assembled to provide a vacuum insulating glass assembly.

In preferred aspects of the second aspect, said manufacturing layouts comprises one or more pane identifiers representing panes to be paired to provide a vacuum insulating glass assembly, wherein said one or more identifiers are based on a unique identifier retrieved from the respective panes.

Said processing arrangement may, in aspects of the second aspect of the invention, be configured to select pane elements to be paired for a vacuum insulated glass assembly based on the estimated resulting surface distance characteristic, and preferably identify said panes in said manufacturing layouts.

In preferred aspects of the second aspect of the invention, said system may be is part of a vacuum insulating glass manufacturing system comprising one or more of the following stations:
a support pillar distribution station configured to distribute support pillars at pane surfaces,
an edge sealing distribution station configured to provide an edge sealing to the panes of a VIG assembly,
a pane pairing station for arranging and aligning panes to be paired, and
a VIG heating and gap evacuation station In advantageous aspects of the second aspect of the invention, said support pillar distribution station may be configured for receiving and processing data of said manufacturing layouts, and wherein said support pillar distribution station comprises a support pillar placement arrangement configured to place support pillars on pane surfaces in accordance with said received and processed data.

In preferred aspects of the second aspect of the invention, said manufacturing layouts may comprise information of support pillars, such as pillar heights for different, predefined positions of a predefined pane having a surface on which a support pillar placement arrangement is configured to distribute support pillars.

In preferred aspects of the second aspect of the invention, said system may be configured to operate in accordance with a method of any of claims 1-26.

In a third aspect, the invention relates to a manufacturing facility for manufacturing Vacuum Insulated Glass units, wherein said manufacturing facility at least comprises
- a support pillar distribution station
- an edge sealing station
- a pane pairing station, and
- a VIG heating and gap evacuation station, wherein said manufacturing facility is configured to manufacture Vacuum Insulated Glass units each comprising at least a first and a second glass pane placed parallel to each other at said pane pairing station, and a plurality of support pillars distributed between opposing surfaces of said glass panes by the support pillar distribution station to provide a gap between the glass panes, wherein said manufacturing facility is configured to manufacture vacuum insulated glass units based on surface topography representations provided by a data processing arrangement based on input from a measuring arrangement.

The manufacturing facility may in aspects comprise a measuring station, wherein said measuring station comprises a system configured to operate in accordance with the method of any of claims 1-26.

The Manufacturing facility may in advantageous aspects comprise a system according to any of claims 27-35 for providing said surface topography representations.

In one or more aspects of the third aspect, said VIG heating and gap evacuation station may be configured for heating an edge sealing provided at said edge sealing distribution station and may be configured to reduce the pressure in said gap. The heating of the edge sealing may be provided to melt the edge sealing such as a solder material, e.g. a glass frit material of the edge sealing.

Said pane elements may generally, as mentioned above, in aspects of the invention as e.g. described in relation to one or more aspects of the first, second and/or third aspect be made from tempered glass such as thermally tempered glass.

FIGURES

Aspects of the present disclosure will be described in the following with reference to the figures in which:

FIG. 1: Illustrates embodiments of the invention where individual topographic representations are determined, FIG. 2: Illustrates a VIG unit according to embodiments of the invention, FIG. 3: Illustrates a VIG unit according to embodiments of the invention, FIG. 4: Illustrates an embodiment of the invention where a data processing arrangement receives measurement data from a measuring arrangement FIG. 4*a*: Illustrates an embodiment of the invention regarding an example of information/data of an estimated surface distance characteristic FIGS. 5-5*b*: illustrates embodiments of the invention wherein manufacturing layouts are determined FIGS. 6-7: Illustrates flowcharts according to various embodiments of the invention, FIG. 8: illustrates an example, of surface variations according to embodiments of the invention, FIG. 9: illustrates an example of testing whether a surface distance characteristic may be considered ok according to embodiments of the invention, FIG. 10: Illustrates a flow chart according to further embodiments of the invention, FIGS. 11-12: Illustrates examples of a measuring arrangement according to embodiments of the invention, FIG. 13: Illustrates a VIG unit manufacturing facility according to various embodiments of the invention, FIGS. 14 *a*-14*b*: Illustrates arranging panes vertically during measuring according to various embodiments of the invention, and FIG. 15: illustrates a building comprising VIG units according to various embodiments of the invention.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 schematically illustrates embodiments of the present invention where individual topographic representations TOPREP_2*a*-TOPREP_2*n* of a plurality of pane elements 2*a*-2*n* are determined and stored in a data storage DS based on measurement data 4 from a measuring arrangement 3 provided in a measuring step.

A plurality of pane elements 2*a*-2*n* are provided on a pane transportation arrangement 20 such as a conveyer arrangement, e.g. a conveyer belt or the like driven by a conveyer drive such as an electric motor (not illustrated). In the present embodiment of the invention, the pane elements 2*a*-2*n* are arranged to lie substantially horizontally on one of their opposing pane surfaces 2*a*, 2*b* to support on the conveyer arrangement.

In preferred embodiments of the invention, the measuring arrangement is an optical measuring arrangement comprising one or more optical sensors and one or more light sources. Different embodiments of the measuring arrangement are described in more details later on.

The measuring arrangement 3 is arranged to determine surface characteristics or surface variations of the upwardly facing surface(s) 21*a* of the panes 2*a*-2*n* and provide an input 4 based thereon. This input 4 may in various embodiments of the invention be processed by a data processor (not illustrated) in order to determine individual topographic representations TOPREP_2*a*-TOPREP_2*n* of each of the pane elements 2*a*-2*n* based on the input 4 from the measuring arrangement 3, and these topographic representations TOPREP_2*a*-TOPREP_2*n* are stored 18 in a data storage DS.

The topographic representations may e.g. in various embodiments include image representations, profile representations of the surface topography or the like.

The measuring arrangement 3 may e.g. be an optical measurement arrangement that includes a plurality of surface variation determination sensors arranged to determine at least a part of the respective pane element surface topography at least at different, predefined locations of the surface 21*a* of said plurality of panes. The surface variation determination sensor of the measuring arrangement 3 may in embodiments be kept in a substantially fixed position relative to the glass panes while providing the measurements.

The measuring arrangement 3 may preferably be configured as a "non-contacting arrangement" such that measuring arrangement includes optical sensors (3*a*-3*n*) and one or more light sources, and/or one or more image sensors.

For example, one or more light sources may transmits light towards the respective pane surface, and the optical sensor(s) may detect the reflected light from said pane surface and converts the detected, reflected light into an electronic signal which may be digitized by an analog to digital converter.

If the measuring arrangement comprises an image sensor, the image sensor may e.g. include a charge coupled device (CCD) sensor.

In other embodiments of the present invention, the measurement arrangement 3 may include a mechanical measuring arrangement comprising at least one mechanical sensor arranged to have one or more components touching said surfaces and provide input based on the topography variations so as to obtain said individual topographic representations.

In various embodiments of the invention, the measurement arrangement 3 may e.g. provide input of the surface variation of the upwardly facing surface(s) 21*a* of the panes 2*a*-2*n* at no more than 97% or no more than 80% or no more than 60% of a plurality of predetermined support areas (SPAR1-SPARn—not illustrated in FIG. 1).

In further embodiments of the present disclosure, the measurement arrangement 3 may provide measurement data 4 of the surface variation at substantially all of the predetermined support areas.

A plurality of the stored topographic representations TOPREP_2*a*-TOPREP_2*n* are then processed by means of a data processing arrangement 6 to estimate a resulting surface distance characteristic SDC between pairs of panes 2*a*-2*n* based on the respective processed topographic representations TOPREP_2*a*-TOPREP_2*n*.

The surface distance characteristic SDC may e.g. be a linear or perpendicular distance that represents a distance variation between opposing or spaced apart surfaces 21*a*, 21*b*, etc. at a location of e.g. predetermined support areas between which a support pillar 9 may extend to space apart or maintain the gap 8 between a proposed combination of glass panes (2*a*-2*n*) that may ultimately form a VIG unit.

The processing of a plurality of the stored topographic representations TOPREP_2*a*-TOPREP_2*n* by the data processing arrangement 6 may preferably comprise processing data HI_1-HI_n relating to similar, opposite predefined support areas (SPAR1-SPARn) of two of said plurality of panes (2*a*-2*n*), see e.g. FIG. 4 or FIG. 8.

Generally, it is understood that the data processor arrangement 6 may comprise one or more hardware processors and corresponding circuitry configured to process data from one or more data storages DS in accordance with software program code stored in a data storage DS1 and provide and preferably store the results of the processing.

In embodiments of the invention, a first data processor 12 may be configured to process the "raw" measurement data 4 from the measurement arrangement 3, in order to provide and store topographic representations TOPREP_2*a*-TOPREP_2*n* in the desired data format(s). A second data processor 6 may thus be provided in order to process the stored topographic representations TOPREP_2*a*-TOPREP_2*n*.

However, in other embodiments of the invention (not illustrated in FIG. 1) the data processor arrangement 12 and 6 may be provided by the same hardware processor.

It is to be understood that the processing arrangement 6 and/or 12 in embodiments of the invention may comprise any suitable type of hardware processor or combination of hardware processors such as one or more central processing units, microprocessors and/or the like, and corresponding circuitry, enabling the processing of the measurement data 4 and/or data in data storage(s) DS, and the like, in accordance with the various embodiments of the invention as described in this document.

Vacuum insulating glass VIG assemblies may thus be provided based on the above, e.g. as described in more details later on, where each VIG assembly comprises at least a first and a second glass pane 2*a*-2*n* a plurality of support pillars 9 distributed in a gap between opposing surfaces the said glass panes to provide a gap 8 between the panes, an edge sealing such as edge solder, e.g. glass frit or another type of edge sealing may be provided around and near the edges of the panes, this assembly is then further processed to provide VIG units by evacuation of the gap 8, and the VIG assembly may be heated to melt/soften the edge solder and then hardened (by cooling) to provide an airtight edge sealing. An evacuation opening solder such as glass frit arranged to cover an evacuation opening in one of the panes (if present) may also be heated to provide a sealing of the evacuation opening and hence seal the evacuated gap.

Figure 2:
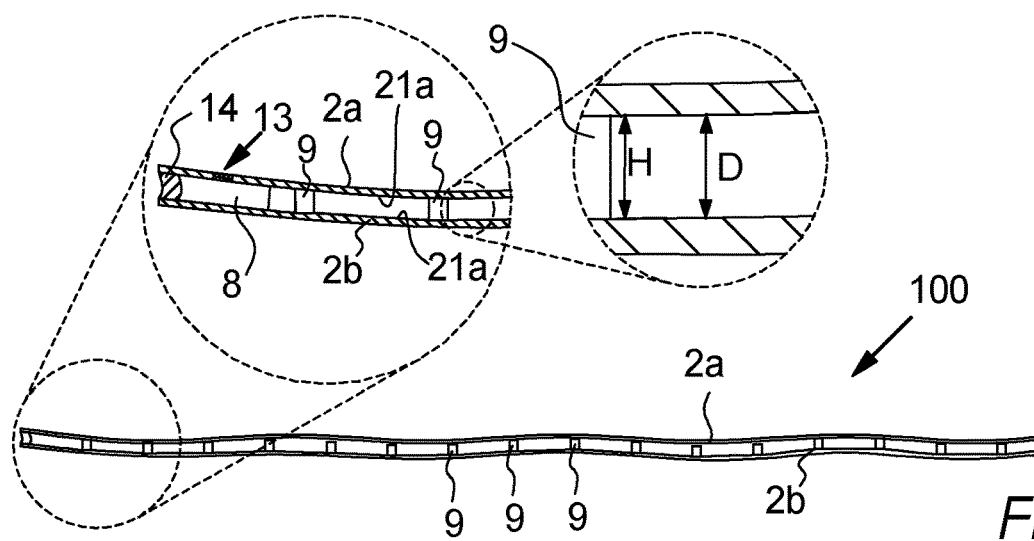
Figure 3:
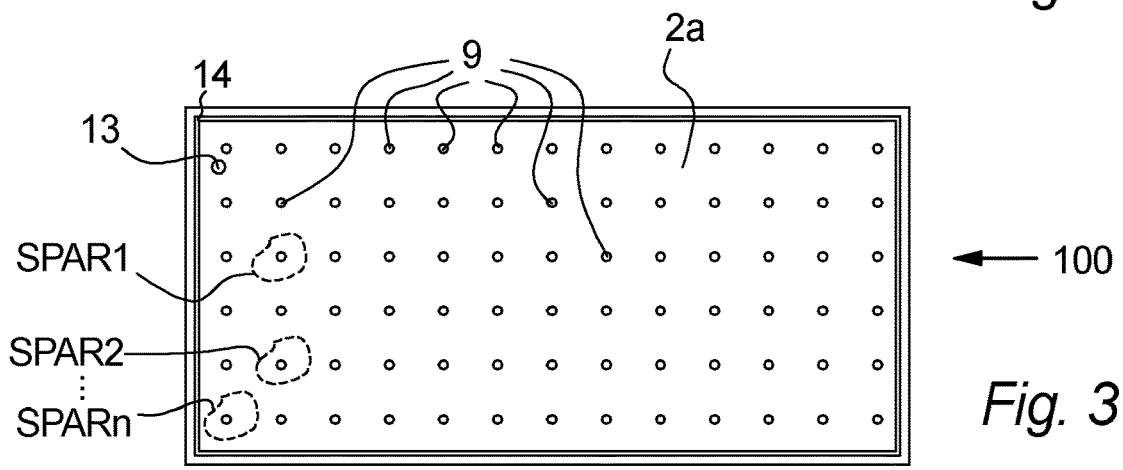

FIG. 2 illustrates a cross sectional view of a VIG unit according to embodiments of the invention. The VIG unit comprises a first glass pane 2*a* and a second glass pane 2*b* arranged parallel to the first pane 2*a*. These panes 2*a*, 2*b* are arranged with a distance D to provide the gap 6 between the panes, and this distance is measured between the surface 21*a* of the panes 2*a*, 2*b* facing the gap 8. The pillars are distributed in the gap 8 between the panes, preferably evenly distributed in rows and columns as illustrated in FIG. 3, and have a height H extending between the surfaces 21*b*. The distance D is provided by the pillars 9. The gap 8 is evacuated to have a reduced pressure compared to the ambient pressure outside the VIG, and has thus been evacuated through an evacuation opening 13, which has subsequently been sealed by an evacuation opening sealing 15 such as a solder material, preferably glass frit or the like.

In preferred embodiments of the invention, the pressure in the gap 8, after evacuation, is preferably below 0.002 mbar, such as below 0.001 mbar. For example, the pressure in the evacuated gap 8 may be below 0.001 mbar, such as below 0.0005 mbar or below 0.0001 mbar.

Generally, in preferred embodiments of the invention, the distance D between the panes of a VIG is between 1 and 5 mm, preferably between 1.5 mm and 2.5 mm, e.g. about 2 mm.

The VIG unit 100 comprises an edge sealing 14 around the edges of the panes 2*a*, 2*b*, in this case between the panes 2*a*, 2*b*, which encloses the gap 8 so that the gap is enclosed by the panes 2*a*, 2*b* and the edge sealing 14. The edge sealing 14 may comprise a solder material such as a glass frit material which has been provided at one of the panes before the panes have been "physically paired", and when subsequently physically pairing the panes 2*a*, 2*b*, the edge frit material extend between the panes.

In embodiments of the invention where the evacuation opening sealing 15 and/or the edge sealing 14 comprises solder material such as glass frit, this solder material is heated so as to melt the solder material (e.g. by melting if the solder material is glass frit material) and/or to evaporate solvent and/or binder material in the solder. The material 14 is then cooled to harden the solder material and hence provides an air-tight edge sealing which seals the gap 8 when it is cooled.

In other embodiments, the edge sealing 14 may comprise one or more clamping devices (not illustrated), a metal solder material or the like for providing an air tight sealing of the gap 8.

The panes 2a, 2b to be paired are generally, in preferred embodiments of the invention, made from thermally tempered glass, but may in other embodiments of the invention be made from glass which is not thermally tempered. The glass panes are transparent to light and one or both of the panes may comprise one or more coatings such as low-e coatings or the like.

FIG. 3 illustrates an embodiment of a VIG unit 100 according to embodiments of the invention, seen from above through the panes 2a, where the plurality of support pillars 9 are visible. The support pillars 9 are distributed evenly in straight, parallel support pillar rows, and preferably so that each support pillar is moreover also included in parallel, straight support pillar columns arranged perpendicular to the rows.

The support pillars 9 supports the panes at different support areas SPAR1-SPARn (not all support pillars 9 and support areas SPAR1-SPARn are indicated by a reference shown in the figure) to maintain the gap 8 when the pressure is reduced in the gap 6 through the evacuation opening 13. The edge sealing is in this embodiment provided between the panes near the edges of the pane as e.g. described above.

FIG. 4 schematically illustrates an embodiment of the invention where a data processing arrangement 12, as e.g. described above, receives measurement data 4 from a measuring arrangement 3 arranged to determine surface variations such as surface height variation of the panes 2a-2n, and stores this data in a data storage as a topographic representation TOPREP_2a-TOPREP_2n of a surface of a respective pane element 2a-2n.

Each topographic representation TOPREP_2a-TOPREP_2n comprises information of the surface variation of the pane surface of a specific pane, preferably at least at proximate support areas SPAR1-SPARn, where a support pillar should be placed.

Accordingly, for example the topographic representation relating to pane 2a comprises topography information for the support area SPAR1, in the form of e.g. a height HI1 compared to a determined reference height, reference plane or reference line, topography information for the support area SPAR2, in the form of e.g. a height HI2 compared to the same determined reference height, reference plane or reference line and so on, e.g. as described in more details later on.

The topographic representations may thus, e.g. comprise image representations or profile representations of the surface topography of a pane 2a-2n.

In preferred embodiments of the invention, each of the plurality of stored topographic representations TOPREP_2a-TOPREP_2n and/or the stored surface characteristics (SDC1-SDCn) are assigned an identifier such as a unique identification PA_ID. Generally, this unique identification PA_ID may be retrieved from or based on a unique identifier UID of the pane 2a-2n on which the respective topographic representation is based. This unique identifier UID on the panes may be a QR code, barcode, a tag such as a RFID tag or the like, and this information is preferably retrieved from the respective pane by a scanning arrangement (not illustrated) configured to scan/determine the unique identifier, e.g. when determining the topography of the pane surface, and is stored in a data storage together with the determined topography representation. This scanning arrangement may e.g. be arranged together or near the measuring arrangement 3, or the measuring arrangement 3 may be configured determine the unique pane identification UID.

The UID scanning may e.g. be provided by an image sensor such as a CCD sensor (not illustrated)

In embodiments of the invention, the location/position of said unique identifier UID at the respective pane is determined and utilized as a reference for subsequent processing to determine pane orientation PA_OR and/or support area SPAR1-SPARn positions.

In embodiments of the invention, the topographic information may comprise data relating to the time and/or date of the establishment of the respective, individual topographic representation, and/or other "meta data" such as e.g. shape (rectangular, square) and/or size (e.g. length of side edges of the respective pane) 2a-2n related to the respective, individual topographic representation TOPREP_2a-TOPREP_2n and/or data relating to the time and/or date of the respective, individual topographic representation. Such information may also in embodiments of the invention be provided in a manufacturing layout.

It is understood that in embodiments of the invention, if the processor arrangement 12 (and/or 6) determines that a topographic representation varies to an extent where the pane would be disadvantageous to use, such a topographic representation may be omitted and not stored in, or alternatively erased from, the data storage so that it is omitted from being a part of processing to estimated surface distance characteristics SDC1-SDCn based on that pane. The system 10 may thus provide an output (not illustrated) to a human operator or a sorting arrangement, identifying the pane to assure the pane is removed from the manufacturing line, is provided to have the surface variation determined again for the sake of good order before discarding the pane and/or the like.

In embodiments of the invention a topography representation of a specific pane may be represented in a plurality of different surface distance characteristics SDC with topography representations of different other panes, to provide an optimized paring of the panes. This may e.g. provide more freedom in combinations of panes and/or support pillar to provide an improved, VIG unit.

The data processor arrangement 6 processes the topographic representations TOPREP_2a-TOPREP_2n to estimate surface distance characteristics SDC1-SDCn between different combinations of the plurality of glass panes (2a-2n) based on the topographic representations (TOPREP_2a-TOPREP_2n) as e.g. described in more details later on and stores 17 these in a data storage DS.

In embodiments of the invention, only surface distance characteristics SDC1-SDCn that are within a predetermined threshold may be stored in the data storage.

It is understood that in embodiments of the invention, the processing arrangement 6 may discard some estimated surface distance characteristics SDC1-SDCn before storing them. For example, if e.g. it is determined that an estimated surface distance characteristic for one reason or another is considered as not relevant. For example, if it is determined that the estimated distance variation between two panes exceeds an upper or lower predetermined threshold or tolerance band and is thus considered too high, too low, too varying or the like, e, this estimated surface distance characteristics may be discarded without saving/storing.

In one or more embodiments, a plurality of the estimated, resulting surface distance characteristics, SDC, may be based on individual topographic representations obtained from the same pane. A topographic representation of a first pane may be compared to a second pane and a third pane, respectively, to see which topographic representation of these panes provides the best fit to the topographic representations of the first pane. The processing arrangement may in embodiments of the invention try out different pane combinations based on the topography representations in order to provide a VIG assembly where the estimated, resulting surface distance characteristic, SDC, is optimized to reduce distance variations between the panes, to fit the pillar height, pillar material, pillar hardness, or pillar shape, to ensure that the distance, D, does not exceed an upper threshold and/or falls below a lower threshold and/or the like.

In embodiments of the invention, a plurality of the panes 2a-2n suitable to be paired may have substantially similar shape and size, and this information may be provided in a topography representation, a SDC or the like in order to determine which panes advantageously may physically be paired subsequently during manufacturing of a VIG. For example, the data processor arrangement 6 may in embodiments of the invention be configured to select panes for which a surface distance characteristic should be estimated, based on e.g. shape and/or size information.

Each stored, estimated surface distance characteristic SDC1-SDCn preferably at least comprises or is associated with pane identification information PAn-ID, PA1_ID, PA2_ID, and information of estimated surface distance characteristic SDC1-SDCn for different support areas SPAR1-SPARn of at least a portion of the plurality of glass panes.

The pane identification information PA1_ID, PA2_ID provides the possibility of later on determining which panes the respective, estimated surface distance characteristic SDC1-SDCn relates to. This information may be retrieved from pane identification information PA_ID of the respective, topographic representation TOPREP_2a-TOPREP_2n, or from another part of a data storage DS containing other pane related information (not illustrated).

The Information of estimated surface distance characteristic SDC1-SDCn for different support areas SPAR1-SPARn of the panes may comprise an estimated distance D1-Dn between the respective support areas SPAR1-SPARn (see e.g. FIG. 4a) of opposing and/or spaced apart panes that may comprise a VIG unit. For example, the distance for support area SPAR1 is D1, for support area SPAR2 it is D2, etc. This may be determined in different ways as described in more details later on in relation to examples of suitable methods of measuring the surface variations and/or establishing topographic representations TOPREP.

In embodiments of the invention, the distance D1-Dn may be represented by the estimated resulting surface variation at a support area (SPAR1-SPARn) and thereto added a "distance offset" which is the distance that provides the gap between the panes due to the support pillar. For example, a distance D1 may be determined to be 0.2 mm due to the surface variations of the panes, and thereto added 0.2 mm to provide the desired distance between the panes by the pillar, i.e. the estimated distance D1 between the panes may be 0.4 mm. In other embodiments of the invention the distance D1-Dn may be represented as the estimated surface variation of the panes alone, and the distance offset may thus be added later on, e.g. if the panes may be used for VIG units having different desired gap distances between the panes such as between 0.1 and 1 mm, e.g. between 0.2 and 0.4 mm, however, preferably about 0.2 mm.

The processing of a plurality of the stored topographic representations TOPREP_2a-TOPREP_2n by the data processing arrangement 6 may as mentioned above, in embodiments of the invention preferably comprise processing data HI_1-HI_n relating to similar, opposite predefined support areas (SPAR1-SPARn) of two of said plurality of panes (2a-2n), see e.g. FIG. 4 or FIG. 8.

The processing of a plurality of the stored topographic representations TOPREP_2a-TOPREP_2n by the data processing arrangement 6 may comprise processing data HI_1-HI_n relating to similar, opposite predefined support areas SPAR1-SPARn of two of said plurality of panes 2a-2n. The similar, opposite predefined support areas preferably relates to support areas which, if the panes represented by the respective, topographic representations were physically paired and separated by support pillars, these similar predefined support areas would be arranged opposite to each other and a support pillar would extend between these areas, see e.g. FIG. 4a.

The processing of a plurality of the stored topographic representations by the data processing arrangement 6 may in embodiments of the invention comprise a levelling step that is provided by a processing arrangement such as the arrangement 6 or 12 in order to level the topographic representations.

FIG. 4a illustrates an example according to embodiments of the invention regarding what the information of an estimated surface distance characteristic SDC may comprise, in this example illustrated based on SDC1 illustrated in FIG. 4.

The system 1 may then provide output data 5 based on one or more manufacturing layouts MAL1-MALn (see e.g. description relating to FIG. 5 and/or FIG. 5) and/or the estimated surface distance characteristics SDC1-SDCn to enable manufacturing of VIG units which is based on the estimated surface distance characteristics SDC1-SDCn and thus based on the topographic characteristic TOPREP_2a-TOPREP_2n of surfaces 21b of panes 2a-2n of the VIG unit.

The output data 5 may in embodiments of the invention provide a notification as to a preferred or appropriate combination of a first glass pane 2a and a second glass pane 2c or a selection of the first glass pane 2a and the second glass pane 2c that may be combined to form a VIG assembly.

Generally, it is understood that the output(s) 5 may be transmitted, retrieved and/or the like in any suitable way by one or more suitable data processing arrangements.

Figure 5:
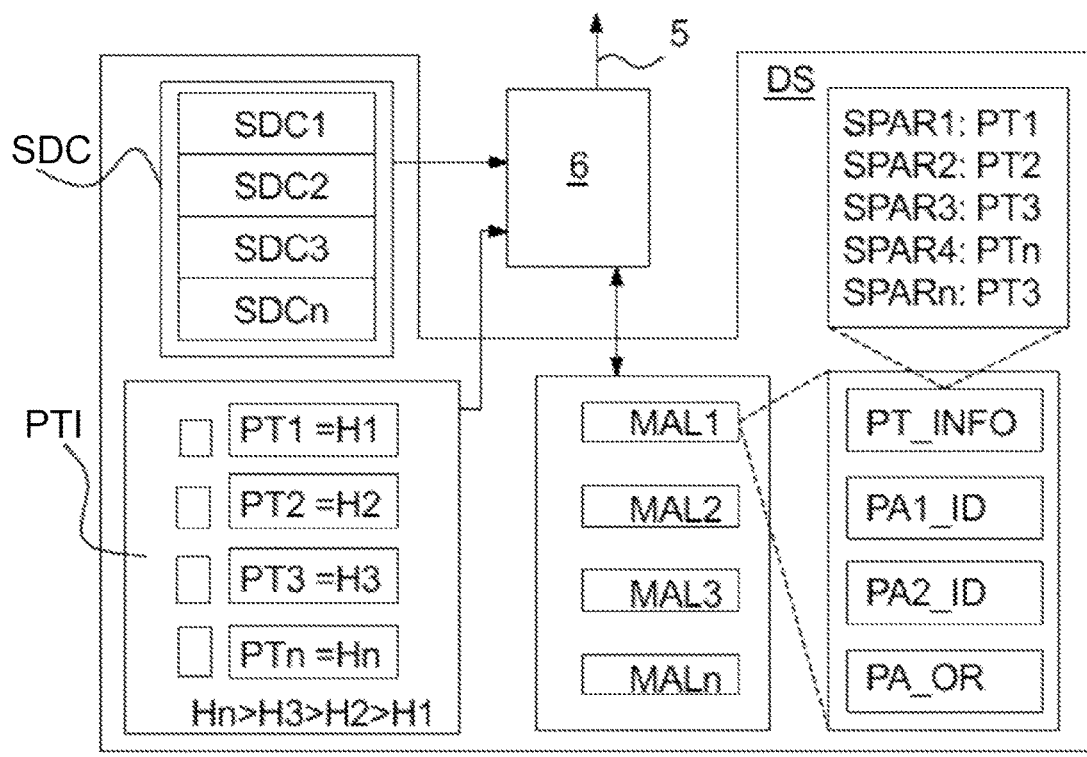

FIG. 5 illustrates embodiments of the invention wherein manufacturing layouts MAL1-MALn are determined by the processing arrangement 6 based on estimated, resulting and preferably stored surface distance characteristics SDC1-SDCn.

The processing arrangement 6 retrieves information from an estimated surface distance characteristics SDC1-SDCn from the data storage DS. This information is processed together with support pillar information PTI retrieved from a data storage, and based thereon manufacturing layouts are established.

The manufacturing layouts MAL1-MALn may comprise support pillar type information PT_INFO for identifying which pillar should be used at the various or different predefined support areas SPAR1-SPARn at the panes based on the surface distance characteristics (SDC1-SDCn). The support pillar type information PT_INFO may thus comprises information enabling a system receiving a manufacturing layout to identify the support area location and which pillar type to be used at this support area.

The support pillar type information PT_INFO may also in embodiments of the invention alone comprise a list of pillar representation data of pillar types PT1-PTn in a predefined order, and thus, by selecting a specific number in a list, this may also identify the pillar type. For example, line 25 in the list may be known to relate to a specific support area having e.g. coordinates x, y (relating to pillar row and column information respectively).

The manufacturing layouts MAL1-MALn may moreover, in embodiments of the invention, comprise orientation information PA_OR representing a mutual or preferred orientation of the first and/or second glass panes, relative to the other of the first and/or second glass pane.

The preferred orientation of the first glass pane and the second glass pane relative to each other may e.g. be based on the surface distance characteristics (SDC1-SDCn) and/or the one or more manufacturing layouts (MAL1-MALn) may be stored by the data storage DS. This orientation information PA_OR may in embodiments comprise information of which pane surface of a first pane PA1_ID to face another pane surface of the other pane PA2_ID of the vacuum insulating glass assembly, and/or which pane edges to be arranged at the same side of the vacuum insulating glass assembly.

The support pillar information PTI may comprise information of different support pillar types, e.g. pillar height, pillar width, pillar material, pillar hardness, pillar density, pillar shape and possibly also other characteristics of different types of predefined pillars. For example, the data storage may comprise information of between 2 and 50 different pillar types, such as between 4 and 15 different pillar types. In the present example, the support pillar information PTI comprises information of four different pillar types PT1-PTn. Pillar type PT1 has a height of H1, Pillar type PT2 has a height of H2, Pillar type PT3 has a height of H3, and Pillar type PTn has a height of Hn, in the present example, Hn>H3>H2>H1.

As can be seen, the different support SPAR1-SPARn in the manufacturing layout MAL1 may be assigned different pillar types PT1-PTn, and thus different pillar heights H1-Hn dependent on the area. In some embodiments, the different pillar types PT1-PTn may be selected based on pillar heights, pillar material, pillar hardness, pillar shape or the like, enabling an individualized manufacturing of VIG units with respect to the different available pillar type placed at desired support areas of the panes.

Figure 5A:
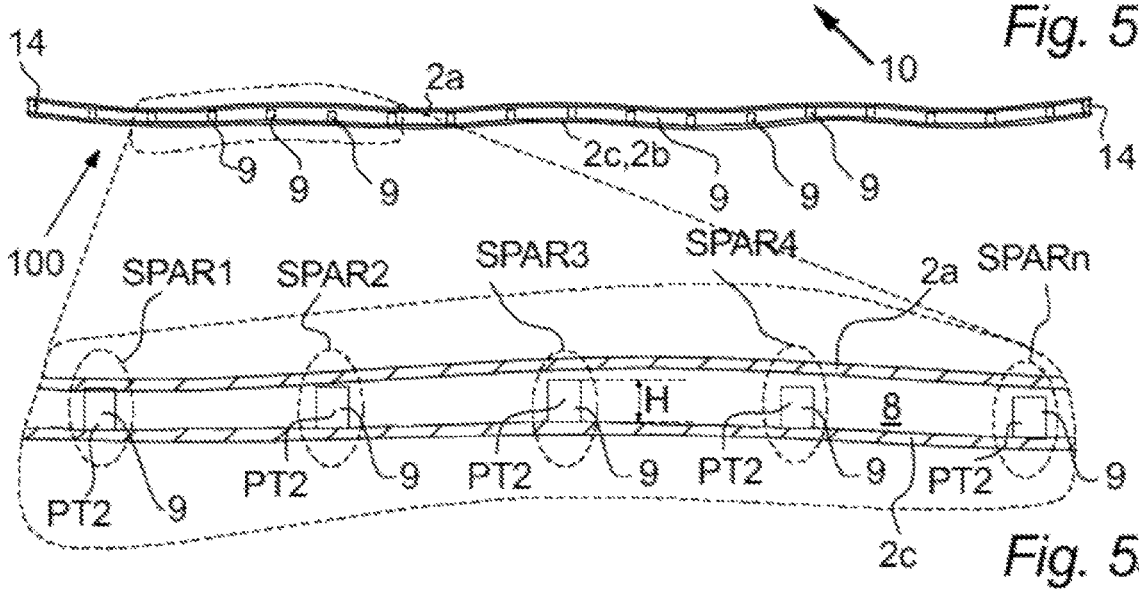

FIG. 5*a* illustrates a cross sectional view of a VIG unit 100 where all pillars 9 are determined to be of the same pillar type and thus has the same height H. as can be seen from the FIG. 5*a*, this situation provides, due to the surface variations between the panes, that the height H of some of the pillars are OK or acceptable, while some of the pillars, e.g. at support area SPAR3 have an insufficient height as the distance between the panes at this area SPAR3 is larger than the height H of the pillar. In other situations, as e.g. at SPAR1, the height of the pillar may be too large for the area SPAR1.

Accordingly, as the same pillar height (i.e. height H2) is not adequate for all the support areas SPAR1-SPARn, the processing arrangement 6 may thus, based on the surface distance characteristic SDC1-SDCn provide a manufacturing layout MAL1 as illustrated in FIG. 5, suggesting different pillar types for the different support areas SPAR1-SPARn.

The pillar type (e.g. a first pillar type, a second pillar type, etc.) that may be determined/selected by a processing arrangement may be based on the pillar representation data and the surface distance characteristic such that a first pillar type may have a first pillar height, a first pillar material, a first pillar density, a first pillar hardness, and/or a first pillar shape while a second pillar type, different than a first pillar type, may have a second pillar height, a second pillar material, a second pillar density, a second pillar hardness, and/or a second pillar shape.

A data processing arrangement may determine a support pillar template that is provided as part of the manufacturing layout MAL. The support pillar template may include information regarding the type of support pillars, height, material, hardness, or shape, to be utilized at different positions in the gap 8 between panes to be paired. Thus, the height, material, hardness, or shape of the support pillars to be used at different positions between the panes selected/determined to be paired varies in accordance with the support pillar template suggestion and the estimated surface distance characteristic. This may e.g. provide that the height, material, hardness, or shape of the support pillars varies in accordance with the surface topography of the panes to be paired, which may help to reduce localized stress forces after the pressure has been reduced in the gap between the panes.

For example, a manufacturing line may have access to a predefined number of predefined support pillar heights, materials, hardness, or shapes between 2 and 50, more specifically between 2 and 20, and in some embodiments between 4 and 10 different support pillar heights, materials, hardness, or shapes, in a support pillar storage. The heights, materials, hardness, or shapes of these may be accessible by the mentioned data processing arrangement, and the selection of pillars may thus be based on available pillar heights, materials, hardness, or shapes.

Figure 5B:
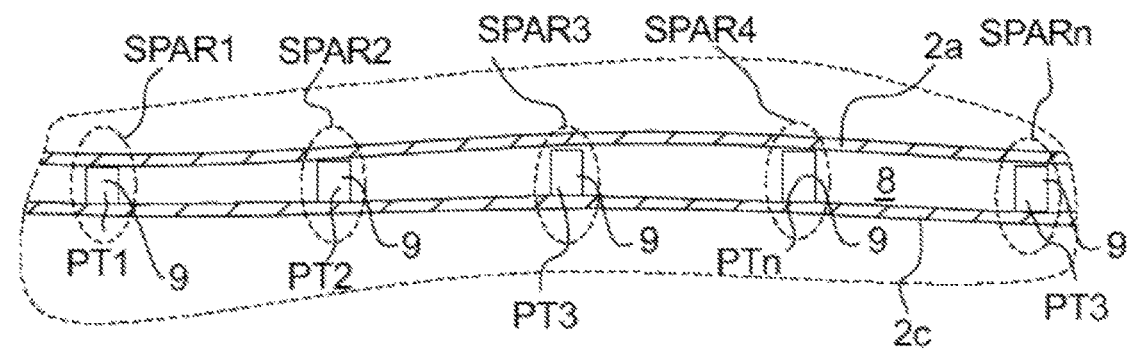

The result of this manufacturing layout MAL1 is provided in FIG. 5*b*, where it can be seen that the support pillars provided at the respective support area SPAR1-SPARn much better fits the surface variations at the respective support area, as the manufacturing layout MAL1 is adapted according to the estimated surface distance characteristic SDC for the panes 2*a*, 2*c*, which is based on the topographic representations relating to the specific panes as e.g. previously described.

The manufacturing layouts MAL1-MALn may moreover, in embodiments of the invention comprise pane identifications PA1_ID, PA2_ID to identify the respective physical panes to which the respective manufacturing layout MAL1-MALn relate. This Identification information may be retrieved from the processed, estimated surface distance characteristic.

It is to be understood, that in embodiments of the invention, the manufacturing layouts MAL1-MALn may be considered separate to the estimated surface distance characteristic, but in other embodiments of the invention (not illustrated), the surface distance characteristic SDC1-SDCn may be configured so that it also comprises the manufacturing layouts MAL1-MALn (or vice versa), and may thus e.g. share the pane identification information PA1_ID, PA2_ID.

In preferred embodiments of the invention, output data 5 is provided based on the manufacturing layouts MAL1-MALn, and the content of this output data 5 may thus utilized during subsequent manufacturing of said vacuum insulating glass (VIG) units to provide VIG units in accordance with the manufacturing layouts MAL1-MALn.

FIGS. 6-7 and 9-10 illustrates flowcharts relating to different data processing provided by the processing arrangement 6 and/or 12 according to different embodiments of the invention.

Figure 6:
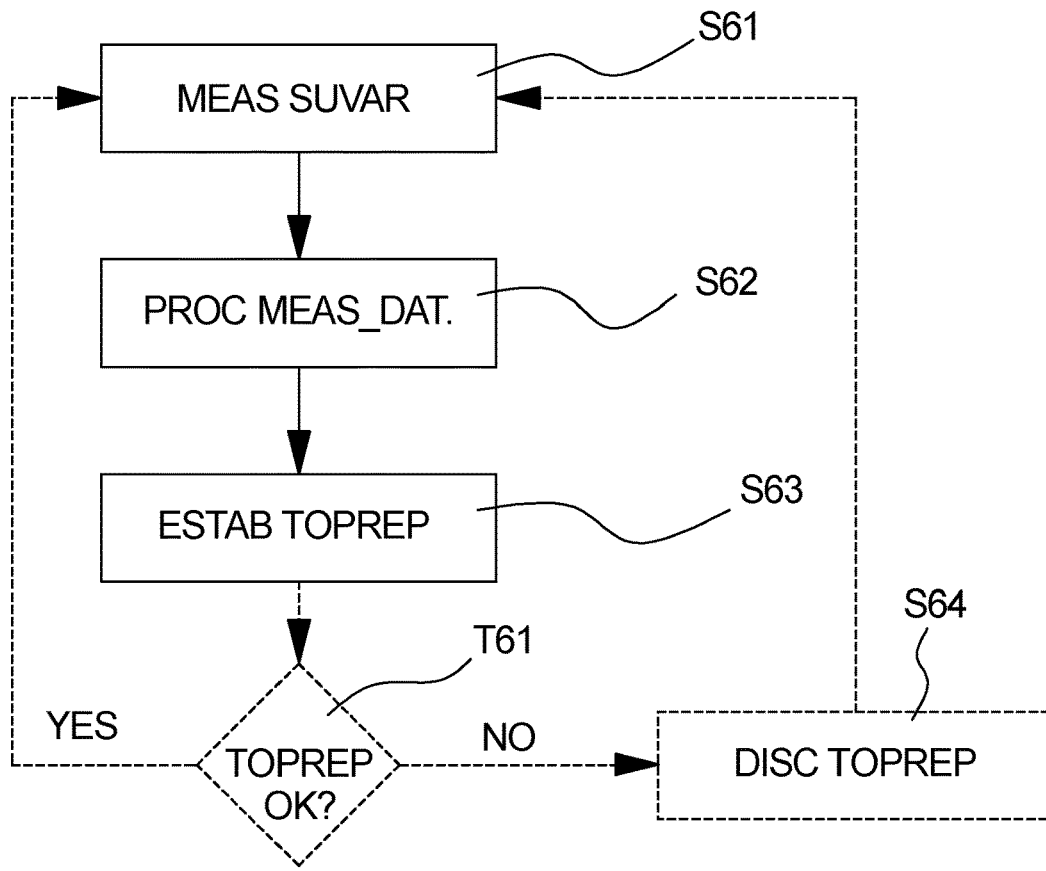

In FIG. 6, the topographic representations TOPREP_2a-TOPREP_2n are established.

The measurement arrangement 3 provides in step S61 (MEAS SUVAR) the surface variation measurement data 4 as e.g. disclosed in relation to FIGS. 1 and/or 4.

This data 4 is processed by the processing arrangement 6 and/or 12 in Step 62 (PROC MEAS_DAT), and the result of this processing is stored in a data storage in step S63 (ESTAB TOPREP). In embodiments of the invention, Steps S62 and S63 may be considered as one step.

The topographic representation may then optionally be processed in test T61 (TOPREP OK?) to determine if the established, topographic representation is considered valid. This may e.g. be determined by processing the topographic representation in order to determine if the determined topographic representation lies within predefined thresholds, and thus may be considered as suitable for a VIG unit, or not. If the test T61 turns out negative, i.e. the topographic representation is not considered valid/OK it may be discarded in step S64 (DISC TOPREP) and measurement data 4 from a new pane may then be processed (S61). The test T61 may also in other various embodiments of the invention be provided during the processing in step S62.

If the test T61 turns out positive, and the topographic representation is thus considered OK for a VIG unit, the TOPREP is maintained and measurement data 4 from a new pane may then be processed (S61).

If the test T61 is not provided, the processing arrangement may continue to step S61 after step S3.

It is understood that in other embodiments of the invention, the test T61 and the steps (S61-S63) may be provided in different processing cycles, e.g. parallel cycles.

Figure 7:
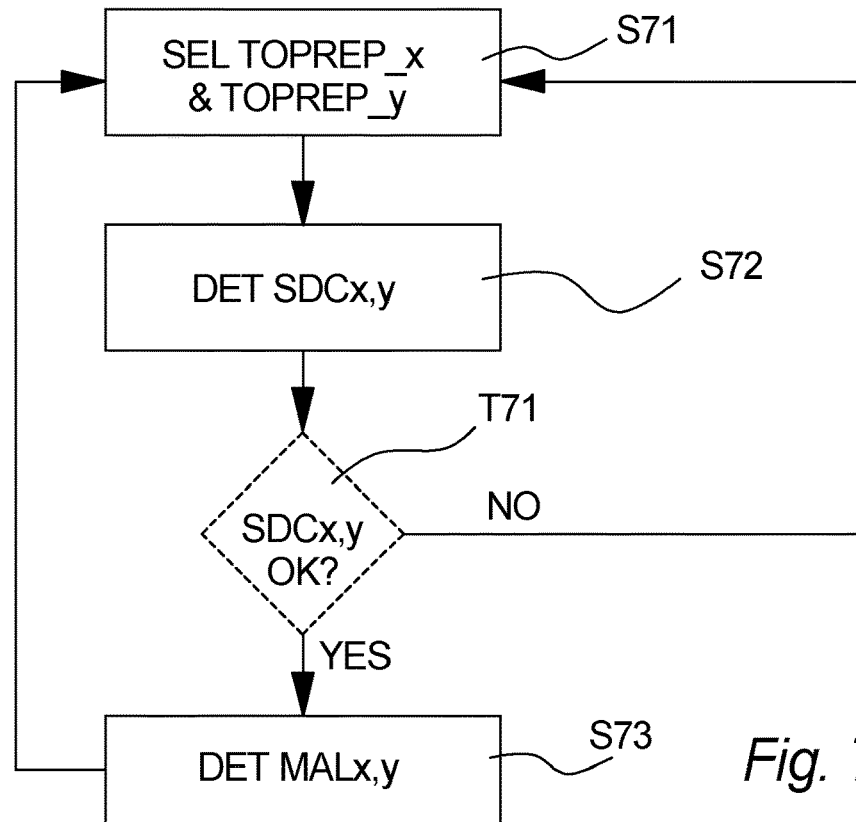

FIG. 7 illustrates embodiments of the invention where surface distance characteristics SDC are determined based on topographic representations TOPREP, e.g. topographic representations provided as explained according to one or more embodiments described above.

Two topographic representations TOPREP_x, TOPREP_Y are selected in step S71 (SEL TOPREP_x & TOPREP_Y), and the processing arrangement 6 processes the data of these ins step S72 (DET SDCx,y) in order to determine a surface distance characteristic SDC for these specific panes. x,y may refer to a pane identifier PA_ID of the respective pane assigned the respective Topographic representations e.g. explained above, it may relate to a data address for the respective topographic representation, a topographic representation number or the like.

The data processing arrangement 6 may in test T71 (SDCx,y OK?) optionally determine if the determined surface distance characteristic is considered ok, this may e.g. be provided as disclosed in FIG. 9.

When the surface distance characteristic has been determined, the data processing arrangement in step S73 (DET MALx,y) determines a manufacturing layout MALx,y for the panes x,y based on the surface distance characteristic SDCx,y. This may e.g. be provided as disclosed in relation to FIG. 9.

In other embodiments of the invention, the processing arrangement may, in step S72 also determine the Manufacturing layout MALx,y during determination of the surface distance characteristic SDC for these specific panes.

FIG. 8 illustrates an example, (exaggerated to improve the understanding) of surface variations of panes 2a, 2c, such as panes from thermally tempered glass. This surface variation SVAR1, SVAR2 may lie within the range of 0.05 mm to 0.3 mm, such as in the range of 0.09 mm to 0.17 mm from the highest "peak" to the lowest "valley", or in some embodiments the surface variation may lie within the range of 0.1 to 0.15 mm naturally, a minor number of outliers may occur. Such variations may be present due to e.g. "roller waves" caused by supporting rollers which supports the pane during manufacturing of the pane, due to "edge lift" causing the pane to deflect between two opposite edges of the pane, thereby causing a parabola or hyperbola shape of the pane and/or the like.

The surface variation SVAR1, SVAR 2 of two different panes are illustrated for the same/comparable support areas SPAR1-SPAR3 of the pane surface, I.e. e.g. SPAR1 of pane 2a is comparable to SPAR2 of pane 2c, and may thus, if the panes 2a, 2c are paired too provide a VIG unit, be arranged opposite to each other and be configured to be support areas between which a support pillar (not illustrated in FIG. 8) is placed.

Generally, it is to be understood that the distance between two neighbouring pillars, and thus support areas SPAR, may preferably be in the range of 20 mm to 50 mm, e.g. about 40 mm, and is preferably substantially similar between all pillars in the final VIG unit. Accordingly, e.g. for a VIG unit of 2000 mm×2000 mm, with pillars having an intermediate distance of about 40 mm, this may result in about 2500 support areas SPAR, and the processing arrangement 6 may in preferred embodiments of the invention determine a surface distance characteristic SDC based on data relating to topographic surface characteristics, e.g. the height measured at no more than 97% such as no more than 80% e.g. no more than 60% of a plurality of predetermined support areas. The surface variation at the remaining support areas may thus be estimated by e.g. interpolation or any other suitable estimation method. In further embodiments of the invention, the measurement arrangement may provide input of the surface variation at substantially all of the predetermined support areas such as at about 100% of these support areas. The characteristics at support areas SPAR which are not directly measured may instead be estimated using e.g. method of interpolation based on a number of directly neighbouring support areas SPAR. This method of interpolation could also be dependent on stored trends based on previously measured surface variations SVAR.

The resulting topographic representation TOPREP in a data storage, obtained by a measurement arrangement in accordance with embodiments of the invention, may be as Table 1 below (however only showing three support areas for the sake of simplicity), which is based on FIG. 8.

TABLE 1

| TOPREP__2a | TOPREP__2c | SDC$_{2a, 2c}$ |
| --- | --- | --- |
| SPAR1 = HI1__1 | SPAR1 = HI2__1 | $\Sigma$ HI$_{SPAR1}$ = HI1__1 + HI2__1 |
| SPAR2 = HI1__2 | SPAR2 = HI2__2 | $\Sigma$ HI$_{SPAR2}$ = HI1__2 + HI2__2 |
| SPAR3 = HI1__3 | SPAR3 = HI3__3 | $\Sigma$ HI$_{SPAR2}$ = HI1__3 + HI2__4 |

As can be seen, from the above, the estimated resulting distance deviation for a surface distance characteristic relating to SPAR1 at a predetermined position (e.g. identified by x,y coordinates) is HI1__1+HI2__1. This may e.g. be provided at step S72, see FIG. 7. In various embodiments of the invention, the glass pane surface profile is normalised e.g. the data set may be normalised relative to the measured value at SPAR 1, such that the surface characteristics measured at further points are presented relative to SPAR 1. For each glass pane, negative values may e.g. represent a variation in surface height relative to SPAR1 which corresponds to a protrusion/peak (towards the glass pane which it is paired with upon pairing) and positive values may represent valleys relative to SPAR1. When the surface distance characteristics between two glass panes are estimated, the summation of the surface characteristics for common SPAR positions relative to SPAR1 may be either positive, indicating a large gap between the panes at that SPAR position, equal indicating no gap between the panes or the panes would be touching or a negative value indicating that there would exist an overlap in the protrusions (even if this is physically impossible).

The measurement arrangement 3 measures the surface characteristics relating to the spatial height of a glass pane at a plurality support areas SPAR at pre-determined positions across the glass pane. The measurement arrangement may be based on a detection of electromagnetic waves, such as an optical measurement arrangement, measuring the variation in height across the surface based on reflected light, such as white light or laser light.

The operation of the optical measurement arrangement may in embodiments of the invention be based on a measure of interference between an initial transmitted wave and a reflected wave, wherein the phase shift i.e. the interference pattern created upon superposition of the waves relate to the height of the surface in relation to the wavelength used.

The measurement, such as an optical measurement arrangement, arrangement may, in other embodiments of the invention, alternatively be based on optical detection of scattered light or specular reflected light from the surface, where the angle of reflected light is dependent on the planarity of the surface.

The measurement arrangement, such as an optical measurement arrangement, may in further embodiments of the invention comprise a focus detection arrangement arranged to measure a reflected light as a lens is moved vertically, i.e. perpendicular to the glass panes. The lens may thus be moved relative to the pane until the focus point for the incident light is obtained and the movement of the lens in order to focus the light, i.e. the vertical displacement relates to the height of the surface. This method may e.g. be advantageous for detecting waviness of a surface, and for larger surface roughness up to approximately 1 mm.

The measurement arrangement 3 may also, in embodiments of the invention, comprise of a physical measurement arrangement comprising one or more stylus devices, arranged in direct contact with the glass surface and moved across the surface such as to register any physical height variations across in order to generate a surface profile. The deflection of the stylus may be registered mechanically or optically such as by reflecting of light of an area of the stylus, where the angle reflection changes as the stylus is deflected due to changes in the surface topography.

The data generated by the measurement arrangement may thus, in embodiments of the invention, comprise information of the heights measured at each predetermined position relative to a reference point REF. This reference point may e.g. be a point, a line or a plane. In embodiments of the invention, the height may be calculated relative to a levelling stage or relative to the measurement arrangement itself which e.g. it may be set to move in a pre-determined plane.

In embodiments of the invention, a measurement at a first support area SPAR1 may produce the data set comprising a first measured value $HI1\_1$ which may be set as an internal reference point for further measured values $HI1\_n$ across the pane e.g. such that a relative height may be computed, stored and possibly displayed. Any value $HI1\_n$ may be used as internal reference for the glass pane, e.g. a maximum value, a minimum value or an average value of the height. This may for example be advantageous interpretable information for the operator in the operation of the measurement arrangement for checking whether or not the measurements is valid or if there is something wrong with the measurement. Furthermore this value for the relative height may be useful in the pairing process, an example hereof is described below.

By setting a value for the distance D1 between the area SPAR1 of a first glass pane and the area SPAR1 of a second glass pane, e.g. by determining that said support areas SPAR1 are to be separated by a distance D1 of e.g. D1=0.2 mm, the distances between the reminding support areas of the paired panes may be calculated as their relative heights are known relative to SPAR1 of the first or second glass pane. This calculated value may be comprised in the surface distance characteristics SDC for the pair of glass panes. Such a value may e.g. be used as input for selecting a support pillar height to be arranged between the panes at the respective support area.

The distance D1 (see FIG. 4a), may in embodiments of the invention be set to different values within a range of values [D1n-D1m] and the preferred distance may be found based on an assessments the distances between support areas SPAR of the panes. The preferred distance D1 may correspond to a setup having large amounts of distances which can be maintained using a pillar selected from a pool of available pillars with a range of discrete pillar heights H1-Hn In one or more examples, the highest peak (i.e. SPAR1 for pane 2a, and SPAR3 for pane 2c) may be used as reference REF, but it is understood that any suitable reference may be used such as e.g. the lowest valley, the first measured value, a calculated mean height reference e.g. calculated as $$HI_{mean} = \frac{\sum_{1 \to n} HIn}{n}$$

For example, the mean height value for pane 2a may be determined using the above equation in the following way $$\frac{\sum_{1 \to n} HI1_n}{n} \to \frac{HI1\_1 + HI1\_2 + HI1\_3}{3} = HI_{mean}2a$$

This may thus result in positive and negative values of the HI1-HIn dependent on if the height difference from the reference REF relates to a peak or valley. For comparison of surface profiles of different panes, the height values may in embodiments of the invention be normalised based on a common reference position, such as SPAR 1. One glass pane may represent several SPAR1 positions dependent on the orientation of the glass relative to the glass pane it is paired with.

It may in embodiments of the invention be preferred for the measurement arrangement 3 that the glass panes to be measured are placed with their major surfaces perpendicular to the direction of the incident electromagnetic radiation such as a light wave, as tilting of the pane may cause the reflected light to miss the detection window.

Prior to pairing glass panes by means of a processing arrangement, a levelling of data points may be needed such that the major surfaces of the glass panes are in the most parallel alignment to each other for assessment of the gap distances Dn. This comparative levelling may be executed based on parallel alignment of a 1D line profile or a 2D plane for each plane generated based on the average height value HI mean calculated based on a plurality of points across the pane. This is an advantageously viable method, as the overall macro-shape of the glass panes are considered to be similar. Note that levelling might not be necessary at all, especially e.g. if the glass panes are hung from a ceiling and aligned naturally based due to applied gravitational force on the panes.

Generally it is to be understood that the topography representations and/or the estimated surface distance characteristics SDC may be determined/established in other ways not directly described in this document. For example the determined reference REF, Height representation (HI1-HIn) of a pane surface at a support area and/or a distance D1 between panes may be represented and processed in any suitable way in order to obtain data that may be compared/correlated to provide surface distance characteristics SDC, determine pillar heights, pane orientations and/or the like.

Likewise, it is understood that the measurement arrangement may be any suitable type of measurement arrangement considered fast and precise enough to obtain data 4 representing surface variations of the panes 2a-2n.

FIG. 9 illustrates an example of testing whether a surface distance characteristic SDC may be considered ok, and this may e.g. in embodiments of the invention provide the "YES" or "NO" selection as illustrated in test T71 (SDCx,y OK?) of FIG. 7.

Initially, z is set to 1 in step 91. Z represents a position such as a support pillar area SPAR as previously explained, e.g. given by (x,y) coordinates with reference to a predetermined set-point such as a corner of the pane, the position of a unique identifier of the pane or the like.

The data processing arrangement 6 tests in step S92 (TE SDC SPARz) the surface distance characteristic for the relevant SDC at a support pillar area area/point SPARz, e.g. by determining/estimating if the SDC for this area lies within a predefined threshold such as a distance threshold.

This information may then be stored, and the next surface distance characteristic for the next support pillar area area/point SPARz may then be tested (by incrementing z if the surface distance characteristic for all support areas SPAR have not been tested, see test TE91 and step S93). When this test is done, the processing arrangement 6 may process the test results from step 72 to determine if the pane or surface distance characteristic is OK and not and if it is OK, the processing arrangement 6 may start to determine a manufacturing layout based on the surface distance characteristic SDC.

Figure 10:
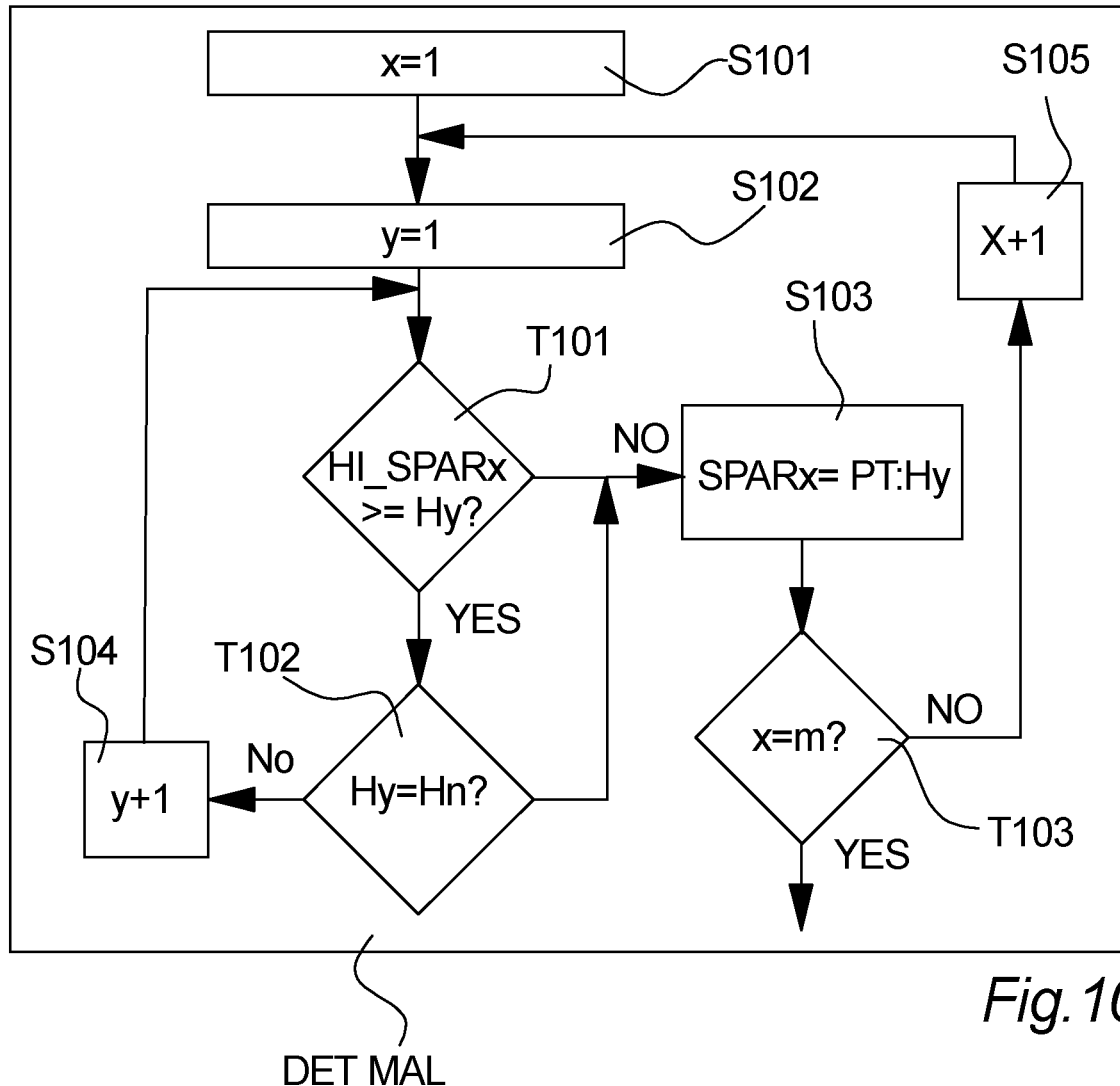

FIG. 10 illustrates, in a flow chart, embodiments of the invention relating to establishment/determination of a manufacturing layout MAL based on a surface distance characteristic. This flowchart may in embodiments of the invention e.g. provide or be part of the determination of a manufacturing layout MAL as described in relation to step S73 of FIG. 7.

The manufacturing layout MAL may include pillar type information PT_INFO regarding support pillars 9 such as at least one of a pillar height, pillar material, pillar hardness, and a pillar shape, to be utilized when combining two or more panes to provide a VIG unit in relation to different pillar heights at different predefined support positions/areas (SPAR1-SPARn) in the gap 8 between the pair of panes. The information of the support pillars may represent a grid of support pillars to be distributed onto the predetermined support positions/areas (SPAR1-SPARn) between surfaces of panes to be assembled to provide a vacuum insulating glass assembly. The manufacturing layout MAL may also include information regarding how panes should be orientated relative to each other, it may comprise information regarding which specific panes may be combined (based on a unique identifier of the pane) and/or the like.

"x" in FIG. 10 relates to a support area (SPAR) number for a given support area, and "y" in FIG. 10 relates to a predetermined height threshold.

Initially, x is in step S101 set to one when starting determination of a manufacturing layout MAL related to a surface distance characteristic SDC. The number of support areas processed is given by "m"

Then y is set to 1 so that the data processor starts with e.g. a first threshold value related to e.g. a pillar height. This may be based on a predefined number of thresholds between Hy and Hn. Thus, the data processor arrangement 6 determines in test T101 (HI_SPARx>=Hy?) whether the height at a first support area SPAR1 is larger than or equal to the first threshold value Hy such as a pillar height. Generally, it is understood that SPARx may refer to a specific support area at a specific coordinate or the like.

If it is higher, the data processor testes in test T102 if the threshold height that was tested for in test T101 corresponds to a predetermined maximum threshold Hn. If this test T102 turns out positive, the pillar type PT is assigned the highest pillar type in step S103 (SPARx=PT:Hy). In other embodiments of the invention, it may instead result in that the manufacturing layout is discarded and the related surface distance characteristic are e.g. discarded from the data storage, and/or that the panes related to the manufacturing layout are removed from the data storage.

If the test T102 turns out negative, the height at the first support area SPAR1 is tested against the next threshold (illustrated by incrementing "y" in step S104 and so that a new threshold is provided in test T101), and this is done until either the test T101 turns out negative, or the largest threshold Hn has be reached (Test T102).

When the data processor arrangement 6 determines that the height at SPAR1 is less than a given threshold in Test T101, the data processor assigns in step S103 (SPARx=PT:Hy) a pillar height to the specific support area matching the relevant threshold. Then x is incremented in step S105 in order to have pillar heights/types selected for the next support area SPAR1, until the last support area SPARm has been tested, this is tested in test T103 (x=m?).

If test T103 turns out positive, the final support area has been tested and thus, pillar heights have been assigned to all support areas SPAR1-SPARm in accordance with the surface distance characteristic SDC.

A manufacturing layout may thus, in embodiments of the invention be represented in a table, list of the like, as e.g. illustrated in Table 2 below, see also reference "PT_INFO" in FIG. 5. This Table may thus also comprise other information such as pane identification, pane orientation information and/or the like.

In the Table 2 below, information of the pillar type or height for each coordinate SPARx, SPARy is provided in a manufacturing layout. Here, y relate to a row number/position in an imaginary support "pillar grid" layout, and x may relate to a column number/position in an imaginary support "pillar grid".

TABLE 2

| | MAL | | | | |
|---|---|---|---|---|---|
| | SPARx = 1 | SPARx = 2 | SPARx = 3 | SPARx = 4 | SPARx = m |
| SPARy = 1 | PT1 | PT2 | PT1 | PT3 | ... PTn |
| SPARy = 2 | PT2 | PTn | PT3 | PT3 | ... PT3 |
| SPARy = 3 | PTn | PT3 | PT2 | PT3 | ... PT2 |
| ½SPARy = 4 | PT3 | PT1 | PTn | PT1 | ... PT2 |
| ... | ... | ... | ... | ... | ... ... |
| SPARy = n | PT2 | PT3 | PT1 | PT3 | ... PT2 |

The table representation in table 2 may thus be considered to represent height H at the respective support area SPAR as a function of the displacement across a plane H(x,y).

In other embodiments of the invention, the topographic representations (TOPREP_2a-TOPREP_2n), the manufacturing layout(s) MAL and/or said surface distance characteristics SDC1-SDCn may comprise information of height HI1-HI_n and/or distance D1-Dn (see e.g. above description) as a functions of a lateral displacement H(x), and/or information of height HI1-HI_n and/or distance D1-Dn as a function of the displacement across a surface plane H(x,y).

This information of table 2 may thus be used during subsequent manufacturing of VIG unit, and a pillar distribution arrangement may thus e.g. be controlled by a data processor configured to process the information/data of the manufacturing layout MAL, such as the above table 2, and thus select pillars in accordance with the manufacturing layout to distribute different pillar types, e.g. having different heights, at the different support areas given identified by the manufacturing layout MAL in one way or the other.

Generally, the support pillar type to be utilized at different predefined support areas may e.g., in embodiments of the invention, be identified in a manufacturing layout stored in a data storage and/or is transmitted/provided as an output data 5. This information may thus be used to place the support pillars during manufacturing of a VIG unit.

Figure 11:
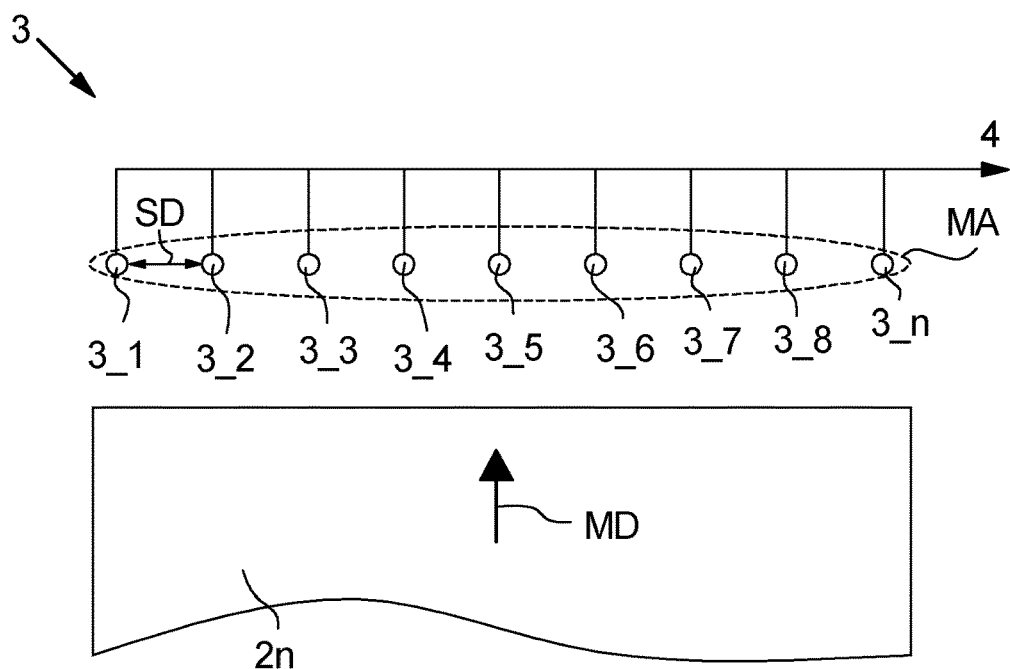

FIG. 11 illustrates an example of a measuring arrangement 3 according to embodiments of the invention.

The measuring arrangement comprises sensors 3_a-3_n which are distributed across a measuring area MA (indicated/surrounded by dashed lines) in a direction transverse to a movement direction MD of a pane 2n which is to be subjected to a measurement to determine a surface topography.

The sensors are preferably arranged in a substantially linear row as e.g. indicated in FIG. 11.

The mutual sensor distance SD between adjacent sensors in the rows is preferably, in embodiments of the invention between 20 mm and 600 mm, such as between 40 mm and 450 mm, e.g. between 30 mm and 150 mm.

The measuring arrangement may in embodiments of the invention comprise between 1 and 500 sensors 3a-3n such as between 10 and 1000 sensors, e.g. about 5-200 sensors, such as between 10 and 80 sensors.

The pane 2n may in embodiments of the invention be moved in the movement direction MD substantially continuous across/through the measuring area MA and the measuring arrangement may be configured to register/determine the surface variation of the pane during this movement.

The pane 2n may in other embodiments of the invention be moved in the movement direction MD in steps across the measuring area MA with intermediate movement breaks, and the measuring arrangement may thus be configured to register/determine the surface variation of the pane surface during the breaks before the next movement.

Figure 12:
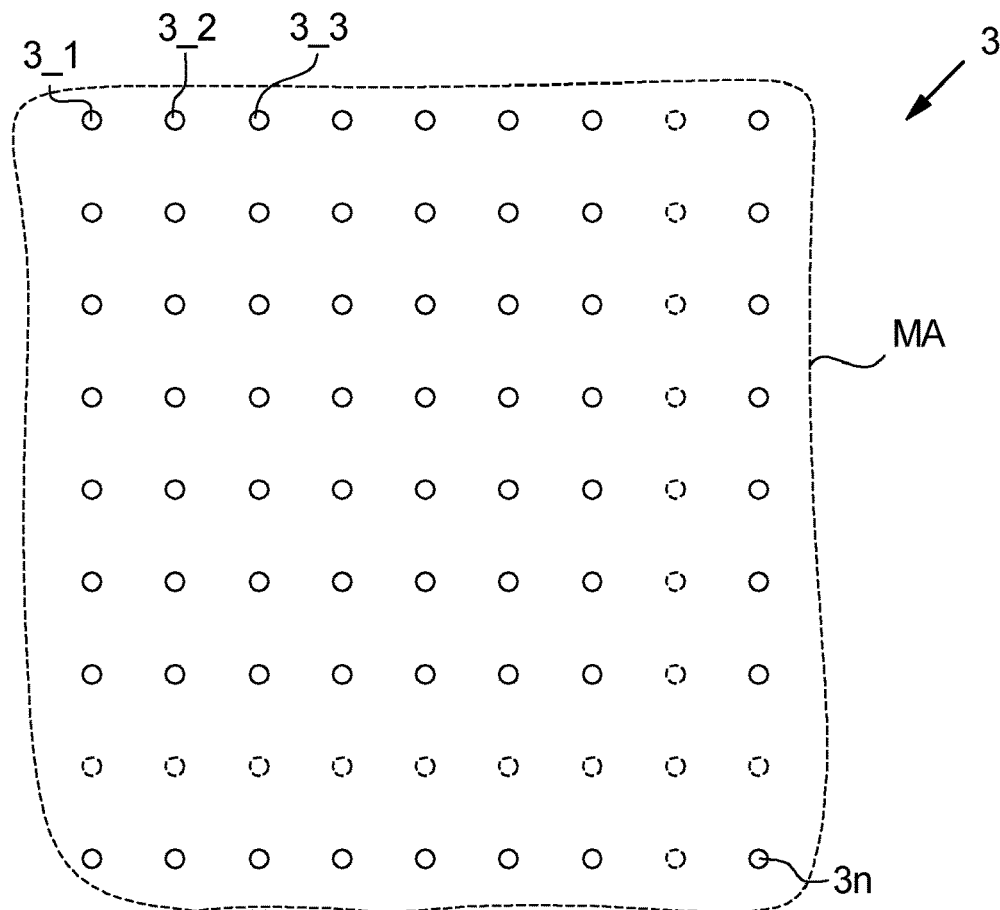

FIG. 12 illustrates another example of a measuring arrangement 3 according to embodiments of the invention. In this embodiment, the measuring arrangement comprises a plurality of sensors 31-3n arranged in a sensor grid, such as in rows and columns. The measurement data 4 from measuring arrangement provided by the sensors 3_a-3_n is not illustrated in FIG. 12 to ease understanding of the figure.

The plurality of sensors (3_1-3_n) are distributed across a measuring area (MA), preferably in one or more substantially linear rows, wherein the mutual distance between adjacent sensors in said one or more rows preferably is between 20 mm and 600 mm, such as between 40 mm and 450 mm, e.g. between 30 mm and 150 mm.

This may e.g. provide that the pane 2b may be arranged within the measuring area MAR and thus, only a single measuring operation may be needed, if the measuring area is considered large enough compared to the surface area of the pane. Alternatively, only a few measuring operations may be needed.

In embodiments of the invention, the sensor grid may comprise between 10 and 1000 sensors 3a-3n such as between 30 and 400 sensors, e.g. between 50 and 200 sensors arranged e.g. in parallel rows and columns.

The number of sensors may in embodiments substantially or at least correspond substantially to the number of support areas for a pane. In other embodiments of the invention, the number of sensors may be less than the overall number of support areas SPAR to be used, (but may e.g. correspond to the number of support areas in the transverse direction of the pane). The measurement arrangement may in embodiments of the invention be configured to measure the height value of several support areas SPAR along a line e.g. extending across the pane in the transverse direction, from which data a surface profile of the line may be provided. A collection of surface line profiles can be combined in e.g. parallel to provide a 2D topographic representation of the glass pane.

The data 4 from the measurement arrangement 3 may e.g. be interpolated in order to determine/estimate a topography representation based on one or more measurement values representing nearby/neighbouring areas of the respective pane e.g. neighbouring line profiles. The interpolated value or line profile may be an average of the neighbouring points or lines respectively.

A value may additionally or alternatively be estimated based on pre-stored values in in stored data. For example, certain types of glass panes mainly comprises a surface variation providing mainly oscillative pattern, in which valleys are separated by peaks along the line of measurement. In such situation, it may be possible to accurately estimate the height values between points of measurement and incorporate these in the topographic surface representation. The data processing arrangement 6 may in embodiments of the invention be configured to recognize a line profile pattern based on the data obtained from the measurement of the glass pane. FIG. 13 illustrates an example of a VIG unit manufacturing facility 1 for providing VIG units in accordance with estimated surface distance characteristics in accordance with embodiments of the invention. The manufacturing facility 1 comprises different manufacturing stations MAST1-MASTn where different parts of the manufacturing of the VIT units are provided, embodiments of these manufacturing stations MAST1-MASTn are described in more details below. These manufacturing stations MAST1-MASTn may be located in different buildings, at the same or different geographical locations or the like, or two or more of the manufacturing stations MAST1-MASTn may be located in the same building according to various embodiments of the invention.

The manufacturing facility 1 comprises a first manufacturing station MAST1 where the topography representations are determined and processed, and manufacturing layouts MAL are e.g. provided and a data output(s) 5 are generated based thereon. This may e.g. be provided in accordance with the embodiment described above or below.

The panes are in this embodiment arranged to provide a parallel measuring of the panes, and are thus arranged at parallel transportation arrangements 20, where and two measuring arrangements 3 provides the measurement input/data 4 comprising information/data of the surface variations of panes 2a-2n subjected to the measurement. In other embodiments of the invention, the first manufacturing station MAST1 may comprise a single line solution, where panes are not arranged in parallel during the measurement of surface variations.

When the surface distance characteristics (and e.g. also manufacturing layouts) have been provided, some of the panes enter the next manufacturing station MAST2 which is a support pillar distribution station where support pillars 9 are distributed at the predefined support areas on the surface of the paired pane elements. The pillars are in preferred embodiments of the invention support pillars selected from a support pillar storage 22 comprising different pillar types, e.g. having different pillar heights H1-Hn as explained previously.

The pillar distribution station MAST2 comprises one or more pillar placement arrangements 23. The pillar placement arrangement 23 may include a robotic arm, a distributed set of support pillar outlets and/or the like, which may be operated by a data processor in accordance with the data of e.g. the manufacturing layouts. Thereby, the support pillars may be placed automatically in accordance with the individual topographic representations and/or the SDC, and thus, an individualized manufacturing of VIG units may be provided.

In the present example two pillar placement arrangements 23 such as e.g. a robotic arm solution which is configured to distribute and place a plurality of support pillars from the support pillar storage(s) 22 and onto an upwardly facing surface of the respective panes (in the example 2e-2f) proximate the SPAR, e.g. while the panes 20 are moved or kept still on a pane transportation arrangement 20.

A pillar distribution controller 24 comprising control circuitry and a data processor arrangement, e.g. comprising one or more hardware processors, a data storage and/or the like, thus receives input 5 from the first manufacturing station MAST1 regarding how to place the pillars. This output data 5 may e.g. comprise the surface distance characteristic SDC, and the pillar distribution controller 24 may thus, in embodiments of the invention, be configured to calculate/determine a support pillar layout, e.g. as explained above in relation to one or more of FIGS. 4, 5-5c, FIG. 10 and/or Table 1 and/or 2 above.

In further embodiments of the invention, the output data 5 may merely comprise topographic representations TOPREP, and the pillar distribution controller 24 may thus be configured to determine surface distance characteristic SDC and/or Manufacturing layouts MAL based on this data.

The pillar distribution controller 24 thus controls the pillar placement arrangements 23 to distribute the support pillars on the pane surface at the desired/determined support areas SPAR.

Preferably, the support pillars are pre-manufactured and are made from a metal, polymer material or the like having a predetermined height H1-Hn. However, in other embodiments of the invention, which is not illustrated, the pillar placement arrangements 23 may be configured to place a solder material such as a glass frit material, which in the end, after a heating process, may constitute the support pillars at the support areas SPAR. In such embodiments, the pillar placement arrangements 23 may comprise an outlet for providing e.g. a predefined amount of solder material from a solder storage, in a paste state, in accordance with the estimated manufacturing layout and/or surface distance characteristic.

The Support pillar distribution station MAST2 may in embodiment of the invention comprise a scanning arrangement configured to scan and process pane identifications such as unique identifiers UID, (see e.g. description in relation to FIG. 4) on the panes 2a, to assure that the pillars placed on the respective pane correspond to the correct data from the first station MAST1.

Other panes, not supplied with support pillars, enters an manufacturing station MAST3 after the first station MAST1. This station MAST3 is an edge sealing distribution station, where an edge sealing 14 is distributed around/near the edges of the panes to provide the edge sealing and enclosing the gap 8. The edge sealing may be a solder as described above, e.g. a glass frit based solder, for example a lead free glass frit solder. At least one of the panes may comprise an opening through which the gap between the panes has been evacuated before closing the opening, also with a solder such as glass frit material. The edge sealing material may be a solder material such as a frit paste material comprising glass frit, a solvent and/or a binder material.

In other embodiments of the invention, the edge sealing may be provided by other means, e.g. at another location in the VIG unit manufacturing process and may e.g. not be an edge sealing 14 arranged between the panes. E.g. it may comprise clamps for squeezing the panes towards each other, and may thus first be provided after Manufacturing station MAST4.

After this, the panes leaving the support pillar distribution station MAST2 and the edge sealing distribution station MAST3, enters a pane pairing station MAST4. The pane pairing station MAST4 is preferably configured to arrange and align pane elements (2a-2n) to be paired.

The pane pairing station may e.g. comprise a pane placement arrangement 30, e.g. comprising a robotic arrangement including a robotic arm for placing the pane elements from the station MAST3 on the panes from the second station MAST2 comprising the distributed pillars.

The pane placement arrangement 30 may e.g. comprise a controllable suction cup arrangement 31 for this purpose. The pane placement arrangement 31 orientates the first pane from the edge sealing distribution station MAST3 so that the edge sealing 14 thereon faces downwards. This may e.g. be provided by rotating a part such as a part of a robotic arm. The pane placement arrangement then places this pane on the upwardly facing surface of the pane comprising the distributed support pillars.

The pane placement arrangement 30 may in embodiments of the invention comprise a scanning arrangement (not illustrated) configured to scan and process pane identifications such as unique identifiers UID, (see e.g. description in relation to FIG. 4) on the panes 2a, to assure that the correct panes are paired. This may e.g. be based on an output from the measuring station MAST1. Thus, the pane placement arrangement may comprise a pane placement controller 32 comprising e.g. a hardware processor and other relevant electronic circuitry configured to compare scanning results from such a scanning arrangement with the data from the measuring station MAST1, to assure that the scanned identification UID of the pane to be handled by the pane placement arrangement 30 correspond to the pane to be paired with an available pane comprising distributed support pillars.

When the panes leaves the pane pairing station MAST4, a VIG assembly 50a-50n having distributed pillars and an edge sealing 14 between the panes is obtained.

After this, these VIG assemblies from the pane paring station MAST4 enters a VIG heating and gap evacuation station MAST5. At this station, the pane assemblies are arranged on support trollies 41a-41n or other types of support arrangements. Then the VIG assemblies are provided with a suction cup over the evacuation opening 13, and loaded into a heating furnace 40.

In the furnace 40, the VIG assemblies are heated, to melt the solder material of the edge sealing 14, a pump (not illustrated) reduces the pressure in the gap 8 between the panes through the evacuation opening by means of the suction cup 42, and the evacuation opening 13 is then sealed by an evacuation opening sealing, (e.g. based on a solder material such as a frit material heated to seal the evacuation opening). After the heating process, and e.g. also subsequent, controlled cooling, in the furnace 40, the VIG units 70 leaves the furnace 40 to further cool, and it may then subsequently e.g. be mounted in a window frame, and mounted in an aperture of a building.

Figure 14A:
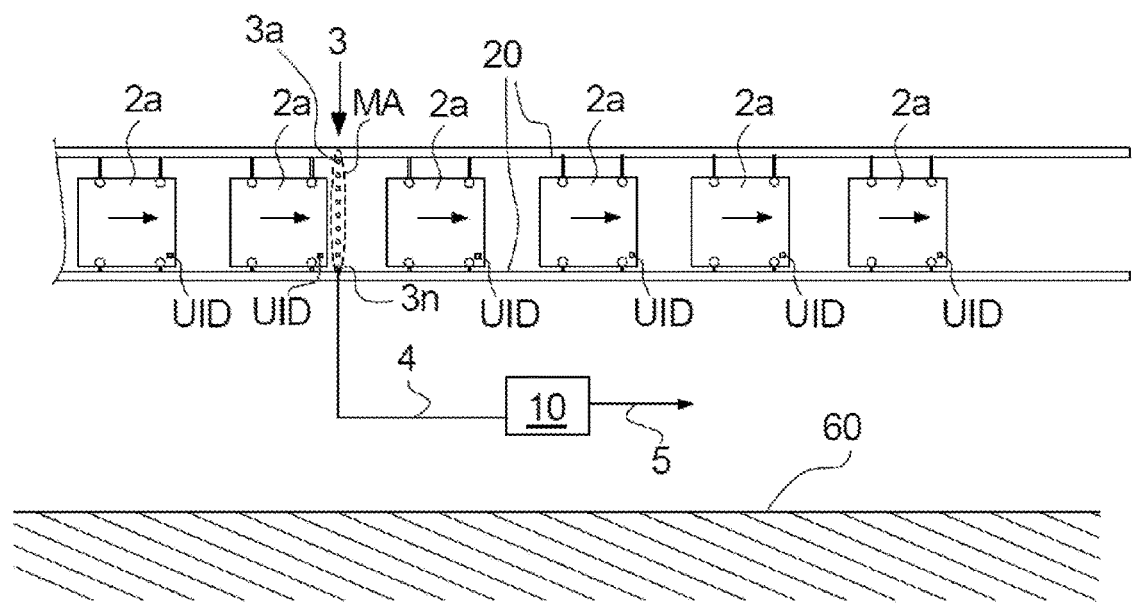
Figure 14B:
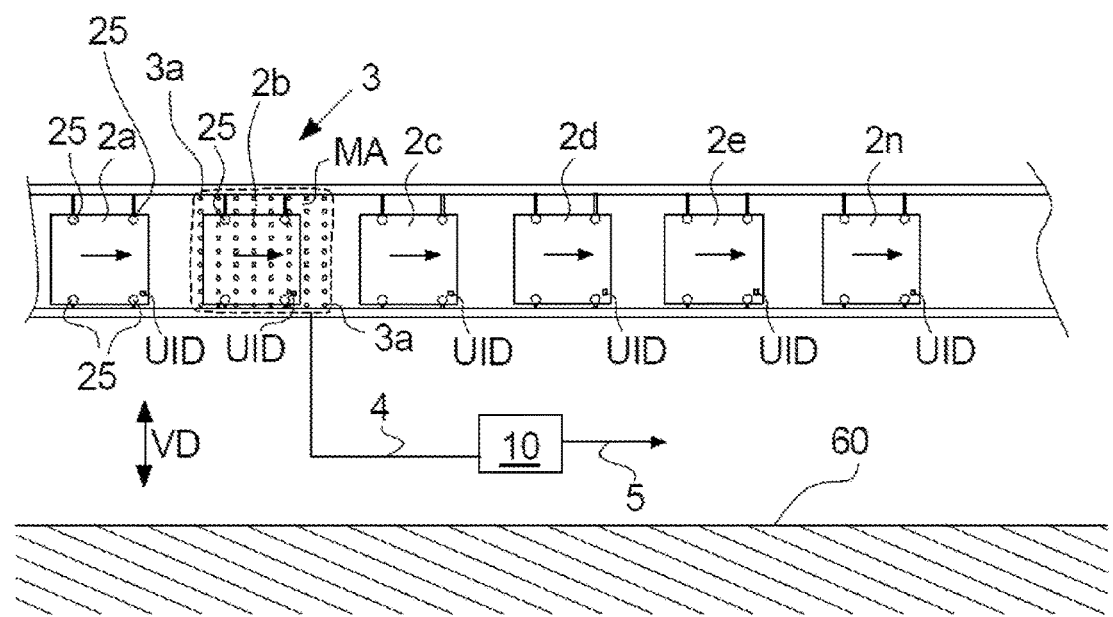

FIG. 14a-14b illustrates an embodiment of the invention where the measurement to determine surface variations is done with substantially vertically positioned panes, in FIG. 14a with a row of sensors, and in FIG. 14b with a grid of sensors. The measuring arrangement 3 used when the panes are arranged vertically may thus, in this embodiment, be a measuring arrangement 3 as described in accordance with various embodiments above or below in relation to e.g. FIG. 11 and/or FIG. 12.

In this embodiment, the panes 2a-2n are held in a vertical position by the pane transportation arrangement 20 above the floor level 60, and extend in vertical direction VD. The pane transportation arrangement 20 in this embodiment comprises pane fixation devices 25 such as suction cups or the like, arranged to hold the pane at the pane surface intended to face away from the gap 8 of the VIG after the pane has been paired physically with another pane.

The transportation arrangement 20 may comprise pane fixation devices 25 to hold the respective pane 2a-2n both at the top and bottom at one or more locations, to reduce the risk of unintended movement of the pane towards or away from the measuring arrangement 3 during the measurement.

A relative movement between the panes 2a, 2b during or between measuring of surface variations may thus be provided in preferred embodiments of the invention. The measuring arrangement 3 thus provides input to the system 10 for processing topography representations TOPREP, and preferably provide surface distance characteristics SDC and/or manufacturing layouts MAL, and providing an output 5 accordingly as e.g. described above according to various embodiments of the present invention according to one or more of the figures.

It is naturally to be understood that in other embodiments of the invention as e.g. illustrated in FIGS. 1, 4 and 13, the panes 2a-2n may be kept horizontally during the measuring, e.g. by lying on a horizontally arranged surface or held horizontally by suction cups or the like.

Figure 15:
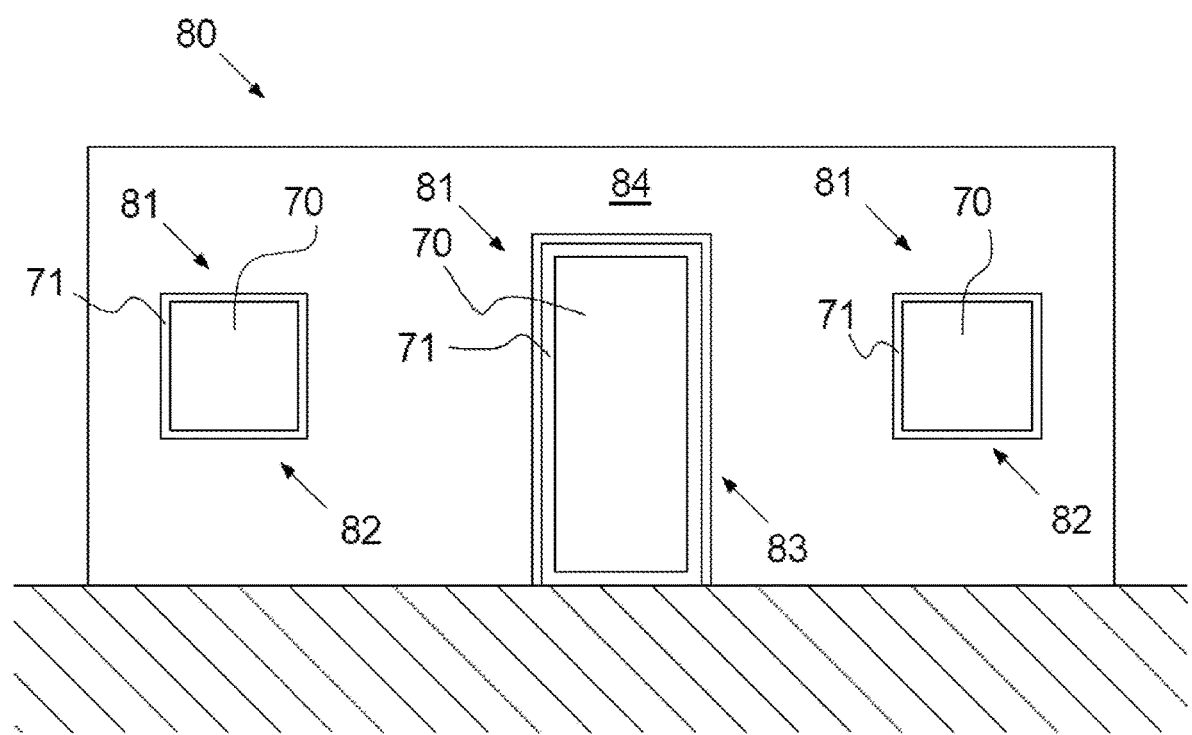

FIG. 15 illustrates a building 80 seen from the outside/exterior, comprising apertures 81 for windows 82 and a door 83 in the outer wall 84 of the building 80.

The apertures 81 are covered by VIG units 70 manufactured in accordance with one or more of the embodiments of the invention described in this document. The VIG units 70 are placed in a frame 71, and the frame 71 is then attached by fastening parts (not illustrated) such as mechanical fastening parts in the form of one or more hinges, screws, nails, mounting and/or the like to the wall 84.

Generally, it is to be understood that the panes described in this document and used for VIG assemblies/units are preferably transparent to light such as light having a wavelength in the range of about 400 nm to 700 nm to at least such a degree which enables humans to see through the panes. Also the panes may be configured so that infrared light (about 700 nm to 1 mm) is transmitted through the pane.

In the illustrated example of the VIG heating and gap evacuation station MAST5, this station comprises two furnaces 40, to be able to provide a manufacturing speed corresponding to the manufacturing speed pf e.g. MAST2-MAST4. In other embodiments of the invention, only one furnace 40 may be used, and in other embodiments, more than two furnaces may be used.

It is to be understood that in embodiments of the invention the measuring provided at the measuring station MAST may be provided away from the subsequent stations MAST1-MAST5. E.g. at another geographical location, and that data 5 may thus in further embodiments of the invention be transmitted over the internet or in any other way to the relevant manufacturing stations, where the data may e.g. be utilized and identified in accordance with scanned pane identifications UID.

In embodiments of the invention which is not illustrated, said measuring arrangement 3 may comprise sensors and a data processing system configured to measure a surface variation at both sides of the pane, e.g. simultaneously, and provide topography representations (TOPREP_2a-TOPREP_2n) and e.g. other information based thereon, e.g. as described above. Thus, a measuring arrangement may be placed at each side of the pane.

In general, it is to be understood that the present invention is not limited to the particular examples described above but may be adapted in a multitude of varieties within the scope of the invention as specified in e.g. the claims.

For example, it is understood that a VIG unit at least comprises two, parallel panes separated by the gap 8, but may also in further embodiments comprise more than two, e.g. three panes, where a middle pane is arranged between two panes each having a surface facing a gap 8, and where the other surface of these panes faces the exterior, and the middle pane's surfaces thus faces two evacuated gaps 8. It is naturally to be understood that in accordance with the present invention, Topographic representations relating to these three panes may be processed, a surface distance characteristic for each of the gaps of such a VIG may be determined to enable manufacturing corresponding to the surface variations of the panes, manufacturing layouts may be provided comprising e.g. pillar type information, orientation information etc.

may be provided for such VIG units as e.g. disclosed above.

Moreover, it is e.g. to be understood that the VIG assemblies or units provided in accordance with the various embodiments described above, preferably are suitable to be used in for covering apertures such as window and/or door openings in a building, it is naturally understood that the VIG units might also be used for purposes in further embodiments of the invention.

It is moreover generally to be understood that the data processing of data 4, and/or other data processing of topography representations, SDC etc. may be provided at a central server arrangement in further embodiments of the invention. It is also generally to be understood that the data storage(s) DS described in this document may be placed in any suitable location, and e.g. be part of a central database accessible over the internet or an internal network such as a Local Area Network or Wireless LAN. Accordingly, the data 5 may be accessed/retrieved by the data processor arrangements 6, 12, 24, 32 in various embodiments of the invention from a central database.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

LIST

1: Manufacturing facility
2a-2n: pane elements 2a-2n
3: Measuring arrangement
3_1-3_n: Sensor(s) of measuring arrangement
4: Input from measuring arrangement
5: Data output
6, 12: Processing arrangement
8: Gap between panes of VIG
9: Support pillar
10: System for processing topography representations, and preferably provide surface distance characteristics and/or manufacturing layouts
13: Evacuation opening
14: Edge sealing
15: Evacuation opening sealing
17: communication between processing arrangement and data storage to store and/or retrieve Surface distance characteristics
18: communication to store topographic representations
20: Pane transportation arrangement
21a, 21b: Pane surfaces
22: Support pillar storage
23: Support pillar placement arrangement
24: Pillar distribution controller
30: Pane placement arrangement
31: Suction cup arrangement comprising one or more suction cups
32: Pane placement controller
40: Heating furnace
42: Suction cup arranged over evacuation opening
41a-41n: Support trollies or other types of support arrangements for supporting VIG assemblies during heating
50: VIG assembly substantially ready for heating/baking and/or evacuation
DS, DS1: Data storages/memory
SDC, SDC1-SDCn: Surface distance characteristic
SPAR1-SPARn: Support areas where support pillars are arranged to support the panes to obtain gab in TOPREP_2A-TOPREP_2NVIG unit
D, D1-Dn: Distance between panes of a VIG unit
H: Height of support pillar.
TOPREP: Topographic representation of a surface of a pane
PA_ID, PA1_ID, PA2_ID, PAn ID: Pane identification
H1-Hn, Hy: Pillar heights for different pillars/Pillar types
HI1-HIn, HI1_1-HI2_3: Height representation of a pane surface at a support area
MAL-MALn: Manufacturing layout
PTI: Pillar type information
PT1-PTn: Pillar type
PA_OR: Orientation information
MD: Pane movement direction
MA: Measuring area for measuring arrangement
MAST1: Measuring station
MAST2: Support pillar distribution station
MAST3: Edge sealing distribution station
MAST4: pane pairing station
MAST5: VIG heating and gap evacuation station

The invention claimed is:

1. A method of providing vacuum insulating glass (VIG) units, wherein the method comprises the steps of:
providing a plurality of pane elements,
obtaining individual topographic representations of each of said plurality of pane elements based on input from a measuring arrangement, and storing said topographic representations in a data storage,
processing a plurality of the stored topographic representations by means of a data processing arrangement to determine a resulting surface distance characteristic between pairs of panes represented by the respective processed topographic representations,
wherein, based on the determined resulting surface distance characteristic, vacuum insulating glass (VIG) assemblies are provided, each comprising at least a first and a second glass pane and a plurality of support pillars distributed between opposing surfaces of said glass panes to provide a gap between the glass panes, and
wherein said vacuum insulating glass (VIG) assemblies are used for providing said vacuum insulating glass (VIG) units.

2. The method according to claim 1, wherein said data processing arrangement determines one or more manufacturing layouts based on said determined, resulting surface distance characteristic, wherein a data output is provided based on said one or more manufacturing layouts.

3. The method according to claim 2, wherein a support pillar distribution station comprises a support pillar placement arrangement, and wherein a pillar distribution controller processes data of said manufacturing layouts and distributes said support pillars in accordance therewith by means of said support pillar placement arrangement.

4. The method according to claim 1, wherein a support pillar type to be utilized at different predefined support areas in the gap between said first and second glass panes is determined by a data processing arrangement based on pillar representation data and said determined surface distance characteristic(s).

5. The method according to claim 1, wherein said plurality of support pillars determined by a processing arrangement to be arranged in the gap at different support areas have different properties.

6. The method according to claim 1, wherein the height of the support pillars to be used at different support areas in the gap between said first and second panes is selected among a plurality of predefined support pillar heights by a data processing arrangement.

7. The method according to claim 1, wherein said first and second glass panes of the vacuum insulating glass assembly are selected between said plurality of pane elements by a processing arrangement based on the determined surface distance characteristics from a group of more than two pane elements.

8. The method according to claim 1, wherein pane orientation information representing information of a mutual, preferred orientation of the first and/or second glass panes, relative to the other of the first and/or second glass pane, is determined based on said determined surface distance characteristics by a processing arrangement.

9. The method according to claim 1, wherein the measurement arrangement comprises an optical measurement arrangement arranged to determine the surface topography comprising a height of the surface at predefined locations of at least a part of the glass pane.

10. The method according to claim 1, wherein the surface distance characteristics between glass panes is based on a comparison of relative heights relative to a common reference points.

11. The method according to claim 1, wherein said measurement arrangement comprises a plurality of sensors determining a part of the respective pane's surface topography.

12. The method according to claim 1, wherein said processing of a plurality of the stored topographic representations by the data processing arrangement comprises processing data relating to similar, opposite predefined support areas of two of said plurality of panes.

13. The method according to claim 1, wherein each of said plurality of stored topographic representations are assigned an identification, and wherein said identification is retrieved from or based on a unique identifier of the pane on which the respective topographic representation is based.

14. The method according to claim 1, wherein said measurement arrangement is configured to measure surface variations in the range of 0.05 mm to 0.3 mm, preferably in the range of 0.09 mm to 0.2 mm.

15. The method according to claim 1, wherein said data storage, said manufacturing layouts and/or said topographic representations comprises information of one or more of the following:
    shape and/or size of pane related to the respective, individual topographic representation
    a pane identification information, and/or
    data relating to the time and/or date of the respective, individual topographic representation.

16. The method according to claim 1, wherein said plurality of pane elements are made from thermally tempered glass.

17. The method according to claim 1, wherein providing of said vacuum insulating glass (VIG) assemblies additionally comprises one or more of the steps of:
    providing an edge sealing material to a glass pane of said vacuum insulating glass (VIG) assemblies and/or
    arranging and aligning said first and second panes opposite to each other with the support pillars placed between the first and second glass panes.

18. The method according to claim 1, wherein said providing of said vacuum insulating glass (VIG) units by using said vacuum insulating glass (VIG) assemblies comprises heating said vacuum insulating glass (VIG) assemblies and/or evacuating said gap between said first and second glass panes of the respective vacuum insulating glass (VIG) assembly.

* * * * *